United States Patent [19]

Sheridon

[11] Patent Number: 5,894,367

[45] Date of Patent: Apr. 13, 1999

[54] TWISTING CYLINDER DISPLAY USING MULTIPLE CHROMATIC VALUES

[75] Inventor: Nicholas K. Sheridon, Los Altos, Calif.

[73] Assignee: Xerox Corporation, Stamford, Conn.

[21] Appl. No.: 08/960,868

[22] Filed: Oct. 30, 1997

[51] Int. Cl.$^6$ .......................... G02B 27/10; G02B 26/00
[52] U.S. Cl. ................................. 359/623; 359/296
[58] Field of Search ........................... 359/623, 296, 359/234, 622

[56] References Cited

U.S. PATENT DOCUMENTS

| Re. 29,742 | 8/1978 | Tung | 2/412 |
|---|---|---|---|
| 2,326,634 | 8/1943 | Gebhard et al. | 88/82 |
| 2,354,018 | 7/1944 | Heltzer et al. | 88/82 |
| 2,354,048 | 7/1944 | Palmquist | 40/135 |
| 2,354,049 | 7/1944 | Palmquist | 40/135 |
| 2,407,680 | 9/1946 | Palmquist et al. | 88/82 |
| 2,600,963 | 6/1952 | Bland | 49/58 |
| 2,684,788 | 7/1954 | Bland | 222/177 |
| 2,794,301 | 6/1957 | Law et al. | 49/84 |
| 2,950,985 | 8/1960 | d'Adrian | 117/33 |
| 2,965,921 | 12/1960 | Bland | 18/2.5 |
| 2,980,547 | 4/1961 | D'Adrian | 106/47 |
| 3,150,947 | 9/1964 | Bland | 65/21 |
| 3,222,204 | 12/1965 | Weber et al. | 117/17 |
| 3,243,273 | 3/1966 | Bland | 65/21 |
| 3,310,391 | 3/1967 | Law | 65/21 |
| 3,617,333 | 11/1971 | Brown | 117/35 R |
| 3,648,281 | 3/1972 | Dahms et al. | 340/373 |
| 3,795,435 | 3/1974 | Schwab | 350/105 |
| 3,915,771 | 10/1975 | Gatzke et al. | 156/71 |
| 4,002,022 | 1/1977 | Lopez | 58/126 R |
| 4,082,426 | 4/1978 | Brown | 350/105 |
| 4,117,192 | 9/1978 | Jorgensen | 428/337 |
| 4,117,194 | 9/1978 | Barbe et al. | 428/374 |
| 4,126,854 | 11/1978 | Sheridon | 340/373 |
| 4,143,103 | 3/1979 | Sheridon | 264/4 |
| 4,229,732 | 10/1980 | Hartstein et al. | 340/378 |
| 4,261,653 | 4/1981 | Goodrich | 350/362 |
| 4,267,946 | 5/1981 | Thatcher | 222/345 |
| 4,288,788 | 9/1981 | Rogers et al. | 340/378 |
| 4,367,920 | 1/1983 | Tung et al. | 350/105 |

(List continued on next page.)

FOREIGN PATENT DOCUMENTS

| 2161301 | 7/1973 | France | G09F 9/37 |
|---|---|---|---|
| 4008825 | 4/1991 | Germany | G09F 9/37 |
| 5357998 | 5/1978 | Japan | G09F 9/00 |

OTHER PUBLICATIONS

Lawrence L. Lee, "A Magnetic Particles Display", *IEEE Transactions on Electron Devices*, vol. ED 22, No. 9, Sep. 1975, pp. 758–765.

Richard A. Strain, "Additive Color Mixture with Fluorescent Pigments and Special Illumination", *Color Research and Applications*, vol. 1, No. 3, Fall 1976, pp. 146–147.

N. K. Sheridon and M. A. Berkovitz, "The Gyricon—A Twisting Ball Display", *Proceedings of the S. I. D.* vol. 18/3 & 4, 1977, pp. 289–293.

(List continued on next page.)

*Primary Examiner*—Georgia Epps
*Assistant Examiner*—Michael Luca
*Attorney, Agent, or Firm*—Nola Mae McBain

[57] ABSTRACT

An electric type paper display having memory properties, rapid response times and multi-optical optical property display with an image of high quality is made. Each display element is wholly in contact with liquid in a cavity and the surface of each display element has a portion with a most positive charge. When an electrical field is applied from the outside, each display element is turned correspondingly to the direction of the electric field and, then electrically migrated through the liquid and attached to the inner surface of the cavity. Among multiple display surfaces of each display element an optical property is selected according to an image signal and is visible through a transparent support to an observer. Afterwards, the attached state of each display element, i.e., its display state is held by the action of an attraction force such as van der Waals force and electrostatic force acting between the circumferential surface of the display element and the inner surface of the cavity, even after the electric field is removed.

27 Claims, 18 Drawing Sheets

U.S. PATENT DOCUMENTS

| | | | |
|---|---|---|---|
| 4,381,616 | 5/1983 | Saxer | 40/502 |
| 4,438,160 | 3/1984 | Ishikawa et al. | 427/214 |
| 4,441,791 | 4/1984 | Hornbeck | 350/360 |
| 4,492,435 | 1/1985 | Banton et al. | 350/360 |
| 4,511,210 | 4/1985 | Tung et al. | 350/105 |
| 4,569,857 | 2/1986 | Tung et al. | 427/163 |
| 4,592,628 | 6/1986 | Altman et al. | 350/486 |
| 4,678,695 | 7/1987 | Tung et al. | 428/120 |
| 4,710,732 | 12/1987 | Hornbeck | 332/7.51 |
| 4,713,295 | 12/1987 | Laroche | 428/406 |
| 4,721,649 | 1/1988 | Belisle et al. | 428/235 |
| 4,725,494 | 2/1988 | Belisle et al. | 428/325 |
| 4,948,232 | 8/1990 | Lange | 350/334 |
| 4,956,619 | 9/1990 | Hornbeck | 330/4.3 |
| 5,039,557 | 8/1991 | White | 427/137 |
| 5,128,203 | 7/1992 | LaRoche | 428/325 |
| 5,155,607 | 10/1992 | Inoue et al. | 359/51 |
| 5,226,099 | 7/1993 | Mignardi | 385/19 |
| 5,262,098 | 11/1993 | Crowley et al. | 264/8 |
| 5,315,776 | 5/1994 | Strawbridge et al. | 40/505 |
| 5,331,454 | 7/1994 | Hornbeck | 359/224 |
| 5,344,594 | 9/1994 | Sheridon | 264/4.1 |
| 5,389,945 | 2/1995 | Sheridon | 345/85 |
| 5,416,996 | 5/1995 | Clemens et al. | 40/502 |
| 5,459,602 | 10/1995 | Sampsell | 359/234 |
| 5,515,075 | 5/1996 | Nakagiri et al. | 345/111 |
| 5,526,016 | 6/1996 | Nakagiri et al. | 345/111 |
| 5,535,047 | 7/1996 | Hornbeck | 359/295 |
| 5,754,232 | 5/1998 | Crowley | 359/296 |
| 5,777,782 | 7/1998 | Sheridon | 359/296 |
| 5,815,306 | 9/1998 | Sheridon | 359/296 |

OTHER PUBLICATIONS

A. Chiang, D. Curry and M. Zarzycki, "A Stylus Writable Electrophoretic Display Device", *S.I.D. 79 Digest*, 1979, pp. 44–45.

M. Saitoh, T. Mori, R. Ishikawa and H. Tamura, "A Newly Developed Electrical Twisting Ball Display", *Proceeding of the SID*, vol. 23, No. 4, 1982, pp. 249–250.

R. Micheletto, H. Fukada and M. Ohtsu, "A Simple Method for the Production of a Two–Dimensional, Ordered Array of Small Latex Particles", *Langmuir*, vol. 11, No. 9, May, 1995, pp. 3333–3336.

Deane B. Judd and Günter Wyszecki, *Color in Business, Science and Industry* (2nd ed.), New York: John Wiley and Sons, Inc., 1967, pp. 387–405.

Wesley Wm. Wendlandt and Harry G. Hecht, *Reflectance Spectroscopy*, New York: Interscience Publishers, 1966, pp. 46–91, 253–275.

G. Chui, "A Page from the Future", San Jose Mercury News, Jun. 18, 1996, pp. 12E, 11E.

J. L. Bruneel and F. Micherson, "Optical Display Device Using Bistable Electrets," *American Institute of Physics*, vol. 30, No. 8, Apr. 15, 1977, pp. 382–383.

Robert L. Saxe and Robert I. Thompson, "Suspensded–Particle Devices", *Information Display*, Nos. 4&5, 1996, pp. 20–23.

Lars A. Yoder, "The TI Digital Light Processing Micromirror Tech: Putting It To Work Now", *Advanced Imaging*, Jun. 1996, pp. 43–46.

PCT International Serach Report, Int'l. Appl. No. US97/10123, Int'l. Filing Date Jun. 25, 1997.

TWISTING CYLINDER DISPLAY USING MULTIPLE CHROMATIC VALUES

CROSS REFERENCE TO RELATED APPLICATIONS

The following applications are related to this application:

"A Method of Manufacturing a Twisting Cylinder Display Using Multiple Chromatic Values" (Attny. Docket No. 92105q2) Ser. No. 08/BBB,BBB, filed concurrently herewith.

"A Method of Manufacturing a Twisting Cylinder Display Using Multiple Chromatic Values" Attny Docket No. 92105q3) Ser. No. 08/CCC,CCC, filed concurrently herewith.

"Twisting Display" (Attny Docket No. 92105) Ser. No. 08/716,672, filed Sep. 13$^{th}$, 1996.

INCORPORATIONS BY REFERENCE

The following patents and application are herein incorporated by reference into this application: U.S. Pat. No. 4,126,854 by Sheridon titled "Twisting Ball Panel Display"

U.S. Pat. No. 4,143,103 by Sheridon "Titled Method of Making a Twisting Ball Panel Display" "Twisting Display" (Attny Docket No. 92105) Ser. No. 08/716,672, filed Sep. 13$^{th}$, 1996.

BACKGROUND

This invention relates to a sheet-like display medium utilizing rotating cylinders which makes use of an electrophoresis phenomenon, and more particularly concerns a sheet-like display medium which uses cylinders with multiple chromatic values to enable, grey scale, highlight color or a full-color display and has paperlike qualities such as being lightweight, thin, portable, flexible, foldable, high-contrast, low-cost, relatively permanent, and readily configured into a myriad of shapes as well as being able to maintain its displayed image without using any electricity.

Although paper has many desirable characteristics, unfortunately, it is not well suited for real-time display purposes. Real-time imagery from computer, video, or other sources cannot be displayed directly with paper, but must be displayed by other means, such as by a cathode-ray tube (CRT) display or a liquid-crystal display (LCD). Typically, real-time display media lack many of the desirable qualities of paper, such as physical flexibility and stable retention of the displayed image in the absence of an electric power source.

Attempts have been made to combine the desirable qualities of paper with those of real-time display media in order to create something that offers the best of both worlds and these attempts have resulted in electric paper.

Like ordinary paper, electric paper can be written and erased, can be read in ambient light, and can retain imposed information in the absence of an electric field or other external retaining force. Also like ordinary paper, electric paper preferably can be made in the form of a lightweight, flexible, durable sheet that can be folded or rolled into tubular form about any axis and conveniently placed into a shirt or coat pocket, and then later retrieved, re-straightened, and read substantially without loss of information. Yet unlike ordinary paper, electric paper can be used to display full-motion and other real-time imagery as well as still images and text. Thus it is adaptable for use in a computer system display screen or a television.

The gyricon, also called the twisting-ball display, rotary ball display, particle display, dipolar particle light valve, etc., offers a technology for making a form of electric paper. Briefly, a gyricon is an addressable display made up of a multiplicity of optically anisotropic balls, each of which can be selectively rotated to present a desired face to an observer. For example, a gyricon can incorporate balls, each having two distinct hemispheres, one black and the other white, with each hemisphere having a distinct electrical characteristic (e.g., zeta potential with respect to a dielectric fluid) so that the balls are electrically as well as optically anisotropic. The black-and-white balls are embedded in a sheet of optically transparent material, such as an elastomer layer, that contains a multiplicity of spheroidal cavities and is permeated by a transparent dielectric fluid, such as a plasticizer. The fluid-filled cavities accomodate the balls, one ball per cavity, so as to prevent the balls from migrating within the sheet. A ball can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the black and white sides of the balls can be caused to appear as the image elements (e.g., pixels or subpixels) of a displayed image.

The gyricon is described further in the patents incorporated by reference hereinabove. In particular, U.S. Pat. No. 5,389,945 (Sheridon, "Writing System Including Paper-Like Digitally Addressed Media and Addressing Device Therefor") shows that gyricon displays can be made that have many of the desirable qualities of paper, such as flexibility and stable retention of a displayed image in the absence of power, not found in CRTs, LCDs, or other conventional display media. Gyricon displays can also be made that are not paper-like, for example, in the form of rigid display screens for flat-panel displays.

Further advances in black and white gyricons have been described in U.S. patent application Ser. No. 08/716,672 titled Twisting Cylinder Display. A gyricon is described which uses substantially cylindrical bichromal particles rotatably disposed in a substrate. The twisting cylinder display has certain advantages over the rotating ball gyricon because the elements can achieve a much higher packing density. The higher packing density leads to improvements in the brightness of the twisting cylinder display as compared to the rotating ball gyricon.

Gyricons incorporating color have been described in U.S. Pat. No. 5,760,761 titled "HIGHLIGHT COLOR TWISTING BALL DISPLAY", and assigned to the same assignee, U.S. Pat. No. 5,751,268 titled "PSEUDO-FOUR COLOR TWISTING BALL DISPLAY", and assigned to the same assignee U.S. patent application Ser. No. 08/572,820 titled "ADDITIVE COLOR TRANSMISSIVE TWISTING BALL DISPLAY", and assigned to the same assignee U.S. patent application Ser. No. 08/572,780 titled "SUBTRACTIVE COLOR TWISTING BALL DISPLAY", and assigned to the same assignee and U.S. Pat. No. 5,737,115 titled "ADDITIVE COLOR TRISTATE LIGHT VALVE TWISTING BALL DISPLAY" and assigned to the same assignee.

These cases all use a spheroidal ball composed of segments arrayed substantially parallel to one another. Each segment of the ball is adjacent to at least one other segment and to no more than two other segments, adjacent segments being adjoined to one another at substantially planar interfaces. Each segment has a thickness and an optical modulation characteristic which may be different from the thicknesses and optical modulation characteristics of the other segments. The ball has an anisotropy for providing an electrical dipole moment, the electrical dipole moment rendering the ball electrically responsive such that when the ball is rotatably disposed in an electric field while the electrical dipole moment of the ball is provided, the ball tends to rotate to an orientation in which the electrical dipole moment aligns with the field.

These balls are used in a gyricon sheet. The gyricon sheet includes a substrate having a surface and spheroidal balls disposed in the substrate. Specific rotations of the balls can be made using the electrical dipole moment and can be used to make a specific segment of a ball and its associated optical modulation characteristic visible. In short, the balls are divided into segments which have different chromatic values and the balls can be rotated such that a particular chromatic value is visible. Considering the wide ranges of chromatic values, balls, and therefore gyricons, with black, white, and highlight color segments can be made, as well as balls with red, blue and green segments or cyan, magenta, and yellow segments for full color systems as well as other optical modulation properties for specialized systems.

The fabrication of the multisegmented ball employing different colors in the different fragments to be used in the gyricon sheet was a large improvement in gyricon technology because it allowed the gyricon to move from the realm of a black and white paperlike display into the realm of highlight color and full color.

However, these color gyricons suffer from several deficiencies. The first of these is a relatively low brightness, a problem inherent with rotating ball displays. The second is poor color saturation due to the way the balls are segmented and used to provide a full color display. When a base color is desired, for instance red in a red-blue-green (RBG) system, then only a small portion of the balls will be used. Using only a small portion of the balls leads to poor color saturation. The third deficiency is poor separation of the colors on the balls. When one colored segment of a ball is displayed often the adjacent colors will be visible at the edges of the segment, particularly when viewing from an off-axis position.

A color gyricon built using cylinders rather than balls has the potential to improve or eliminate these deficiencies. Closer packing arrangements are possible leading to improved brightness and contrast. Additionally, the cylindrical elements can be partitioned to reduce viewing of adjacent colors in an off-axis viewing position. Most importantly, the colors can be partitioned so that all elements will be used when viewing the optical properties leading to improved brightness and saturation for those optical properties.

A display system using a multicolor rotating cylindrical element has been patented in U.S. Pat. No. 5,526,016 and U.S. Pat. No. 5,515,075 both titled "MULTICOLOR DISPLAY APPARATUS". These patents describe a large multicolor display which has been divided into unit blocks where each block has a plurality of sections. Each section contains a multicolor display element with a rotary color display member. The color of the unit block is determined by the colors of the display elements within the unit block. The display can show a variety of colors by using various combinations of colors within the unit block. Each of the rotary color display members is affixed to shaft that also has a permenent circular magnet fixed to it. The circular magnet rotates with the rotary color display member. The rotary color display members are rotated by using magnetizing coils to selectively polarize cores in a series of stators. An electronic circuit on a circuit board is used to select and polarize individual cores, and cause individual elements to rotate.

However this system is large and bulky and requires mechanical connections and movements which require packaging in waterproof and dustproof casings to insure that the display will operate properly, especially when the display is used in outdoor conditions. If such a system could be built which eliminates mechanically rotating parts the display could be made thinner and lighter and operate more reliably when used in adverse environments.

Accordingly, it is the primary aim of the present invention to provide a display medium which has the desirable qualities of paper, qualities such as being lightweight, thin, portable, flexible, foldable, high-contrast, low-cost, relatively permanent, and readily configured into a myriad of shapes as well as being able to maintain its displayed image without using any electricity while also being able to display real-time imagery from computer, video, or other sources. Furthermore the display medium should also have good brightness characteristics and be capable of displaying multiple optical properties such as grey scale, highlight color or full color, and including (but not limited to) polarization, birefringence, phase retardation, light scattering, and light reflection with good saturation in the individual optical properties. Additionally the display medium should be as self-contained as possible with a minimum of mechanical connections or interfaces.

Further advantages of the invention will become apparent as the following description proceeds.

SUMMARY OF THE INVENTION

Briefly stated and in accordance with the present invention, there is provided a display element with a substantially clear cylindrical shape having a circumference, a length and longitudinal axis which has at least three display surfaces arranged in a circumferential direction around the longitudinal axis to form a polyhedral column extending parallel to the longitudinal axis. Each display surface has an associated optical modulation characteristic, and the polyhedral column is enclosed by the substantially clear cylindrical shape. The display element also has an anisotropy for providing an electrical dipole moment, the electrical dipole moment rendering the display element electrically responsive such that when the display element is rotatably disposed in a non-oscillating electric field, while the electrical dipole moment of the display element is provided, the display element tends to rotate substantially around the longitudinal axis to an orientation in which the electrical dipole moment aligns with the field.

There is also provided a transparent sheet-like substrate wherein a plurality of the display elements are two-dimensionally arranged. The transparent sheet like substrate having two surfaces, one of which is a substantially optically transmissive viewing surface in which an image display surface is formed.

BRIEF DESCRIPTION OF THE DRAWINGS

FIG. 2 is a view showing the separated state of a sheet-like display device according to the present invention, in which

FIG. 5 is a view showing the array of display elements according to the present invention, in which

FIG. 7 is a view showing the positional relation between display elements and electrodes according to the present invention in which

FIG. 8 is a view showing the display operation of one display element according to the present invention in which

FIG. 10 is a view showing another embodiment according to the present invention, in which

A FIG. 11 is a side view showing different orientations of a display element.

FIG. 13 shows a first step in assembling a display medium.

FIG. 19 shows an alternate first step in assembling a display medium.

FIG. 20 shows an alternate second step in assembling a display medium.

Figure 1:
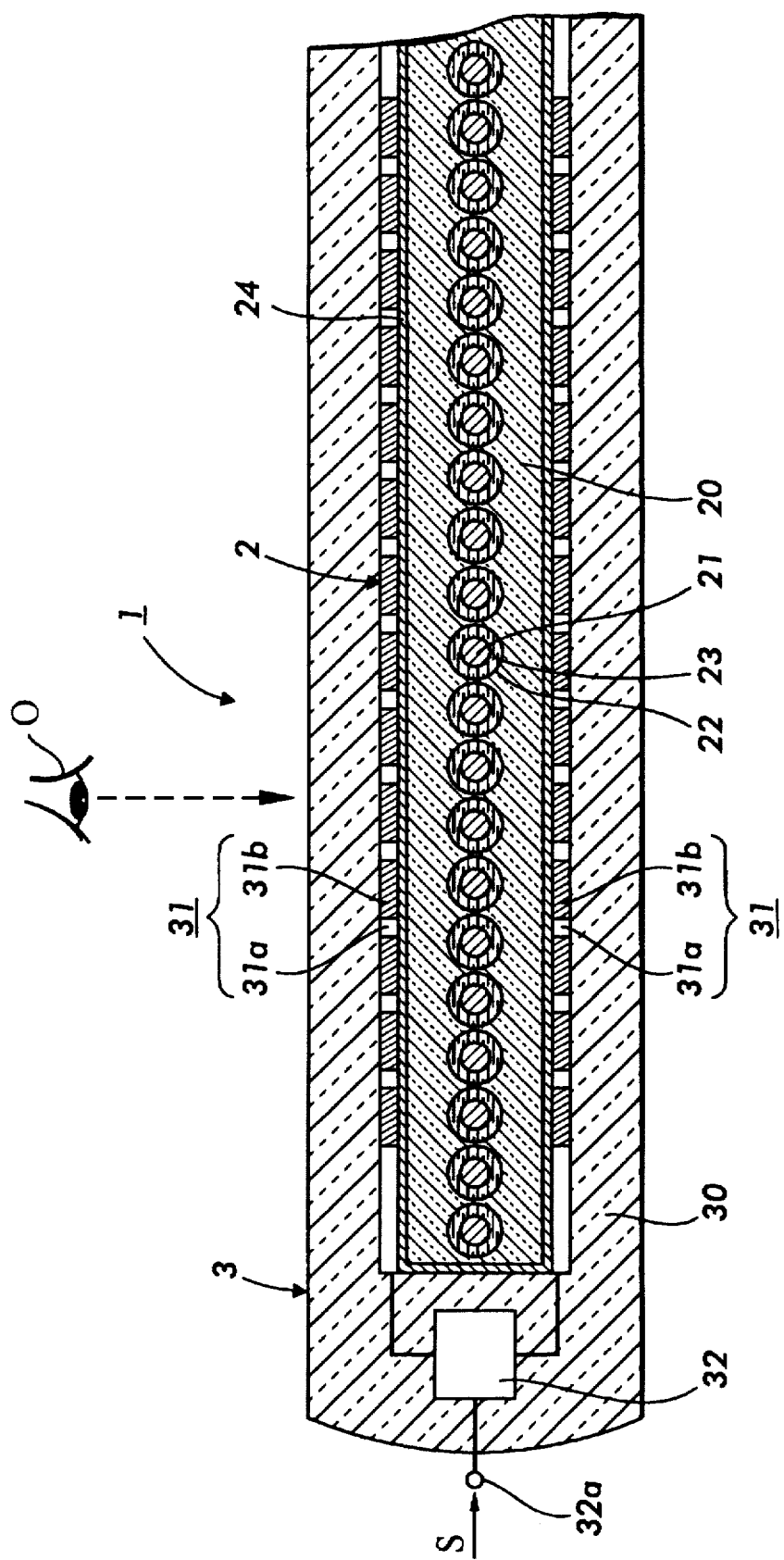
FIG. 1 is a sectional view showing the mounted state of a sheet-like display device according to the present invention.

While the present invention will be described in connection with a preferred embodiment and method of use, it will be understood that it is not intended to limit the invention to that embodiment/procedure. On the contrary, it is intended to cover all alternatives, modifications and equivalents as may be included within the spirit and scope of the invention as defined by the appended claims.

ALPHA-NUMERIC LIST OF ELEMENTS

E—electric field
$E_d$—downward electric field
$E_u$—upward electric field
$E_l$—leftward electric field
$E_r$—rightward electric field
L, L'—longitundinal axis
O—observer
$S_1$—separation line
$S_2$—separation line
$S_n$—separation line
1—sheet-like display device;
2—sheet-like display medium;
3—drive device;
4A, 4B, 4C, 4D, 4E, 4F, 4G—picture element;
20—support;
21,21'—display element;
21a, 21a'—display surface;
21b, 21b'—display surface;
21c, 21c'—display surface;
21d'—display surface;
22—cavity;
22A, 22A'—circumferential surface
23—liquid;
24—protection layer;
30—case;
30a—opening;
30b—contact portion;
31—discrete electrode group;
31—insulating region;
31b—discrete electrode;
32—drive circuit;
32a—signal input terminal
40, 40'—clear cylindrical surface
42, 42'—multisided display surface
44—large format display element
46—heating element
48—filament
50—pulling device
52—substrate
54—sticky surface
56—optically transparent material
58—cavity
60—storage tube
62—separation opening
64—guide tube
66—separation tool
68—magnetic portion
70—magnetic field
72—optically transparent material
74—magnetic field

DETAILED DESCRIPTION OF THE INVENTION

In order to attain the above object, according to the present invention, there is provided a sheet-like display medium, which holds a displayed image and comprises a plurality of display elements of a cylindrical, prismatic or other columnar shape, each of which has a plurality of display areas classified by a plurality of optical properties (such as grey scale, highlight color or full color, and including (but not limited to) polarization, birefringence, phase retardation, light absorption, light scattering, and light reflection) in a circumferential direction around the element, and a transparent sheet-like support, in which an image display surface is formed on at least one surface and the plurality of display elements are two-dimensionally arrayed by suspending the plurality of display elements in light-transmitting liquid such that the plurality of display areas of the plurality of display elements are in parallel with the image display surface.

According to the above constitution, in the presence of a dielectric fluid the display elements are electrically dipolar. Accordingly, when an electric field is applied from outside of the sheet-like display medium, in response to an image signal, each display element is turned correspondingly in the direction of the electric field. Further, each display element thus turned is electrically migrated over the light-transmitting liquid, and then attached to the inner surface of a cavity, in which the light-transmitting liquid, is contained. Among the plurality of optical properties in the circumferential direction of each display element, an optical property according to the image signal is visible from the outside through the transparent sheet like support. When each display element is turned and once attached to the inner surface of the cavity, the attached state of each display element, i.e., its display state is held by the action of an attraction force such as van der Waals force and electrostatic force acting between the circumferential surface of each display element and the inner surface of the cavity, even after the electric field is removed.

In order to attain the above object, according to the present invention, there is also provided a sheet-like display device, which displays and holds an image, and comprises a plurality of display elements of a cylindrical, prismatic or other columnar shape, each of which has an electrical anisotropy with a plurality of areas classified by a plurality of optical properties in a circumferential direction, a transparent sheet-like support, in which an image display surface is formed on at least one surface, held by the action of an attraction surface, and the plurality of display elements are two-dimensionally arrayed by suspending the plurality of display elements in a light-transmitting liquid such that the plurality of display areas of the plurality of display elements are in parallel with the image display surface, and an electric field application means for turning one of the plurality of display areas toward the image display surface by applying an electric field corresponding to an image signal to each of the plurality of display elements.

In order to attain the above object, according to the present invention, there is further provided a method of manufacturing a sheet-like display medium for holding a displayed image. This method comprises the steps of manufacturing a plurality of display elements of a cylindrical, prismatic or other columnar shape, each of which has an electrical anisotropy and a plurality of display areas classified by a plurality of optical properties in a circumferential direction, supporting the plurality of display elements by a transparent sheet-like rubber member, in which an image display surface is formed on at least one surface, by two-dimensionally arraying the plurality of display elements in the sheet-like rubber member such that the plurality of display areas of the plurality of display elements are in parallel with the image display surface, and swelling the sheet-like rubber member by immersing the sheet-like rubber member in a light-transmitting liquid to thereby hold the plurality of display elements in the light-transmitting liquid in a suspended state.

Hereinafter will be described an embodiment of the present invention in detail with reference to the accompanying drawings.

Figure 2A:
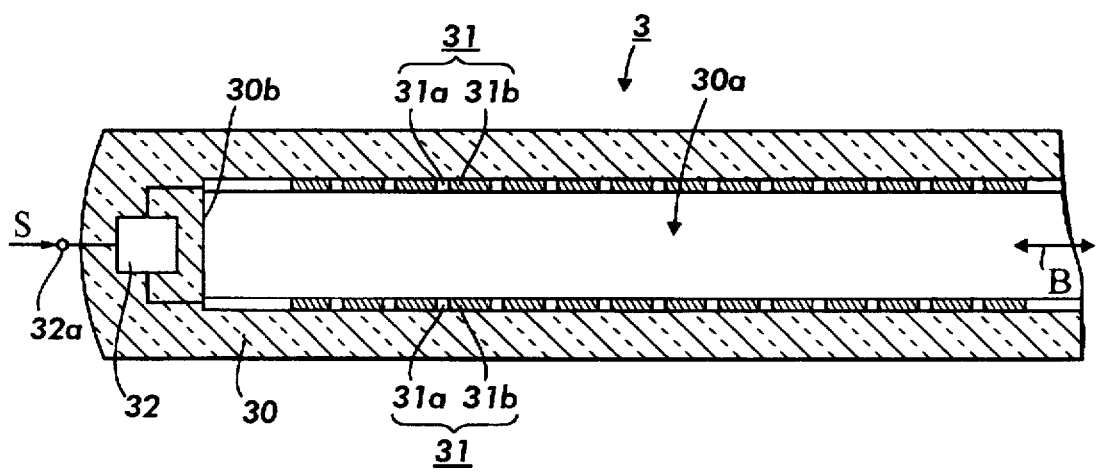
FIG. 2(a) is a sectional view showing a drive device included in the sheet-like display device.
Figure 2B:
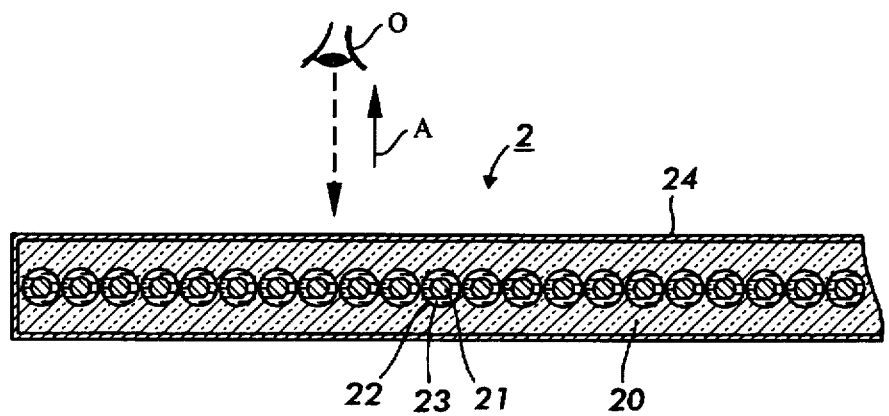
FIG. 2(b) is a sectional view showing a sheet-like display medium included in the sheet-like display device.

FIG. 1 is a sectional view showing the mounted state of a sheet-like display device as an embodiment according to the present invention, and FIG. 2 is a view showing the separated state of the sheet-like display device shown in FIG. 1. FIG. 2(a) is a sectional view showing a drive device included in the sheet-like display device, and FIG. 2(b) is a sectional view showing a sheet-like display medium included in the sheet-like display device. This sheet-like display device (hereinafter display device) 1 comprises a sheet-like display medium (hereinafter display medium) 2 for multi-optical property display toward a visible side A, and a drive device 3 for driving the display medium 2. As shown in FIGS. 2(a) and 2(b), the display medium 2 is capable of being inserted into and pulled out of the drive device 3 in the direction B.

The display medium 2 includes a plurality of display elements 21 two-dimensionally arrayed in a single layer. The plurality of display elements 21 are supported by a support 20 consisting of a transparent material such as silicone rubber, for instance, and a cavity 22 is formed around each display element 21. The cavity 22 is filled with transparent liquid 23 such as isoparaffin hydrocarbon, for instance. The surface of the support 20 is covered with a protection layer 24 such as a transparent plastic film. A charge control agent, as known in the art, is added to the isoparaffin hydrocarbon according to circumstances in order to control the charging of the display element surface.

The drive device 3 has a case 30 consisting of transparent plastic or the like. As shown in FIG. 2(a), this case 30 has an opening 30a, in which the display medium 2 is mounted, and a contact portion 30b for positioning the display medium 2. Matrix-shaped transparent discrete electrode groups 31 are arranged on the inner surface of the opening 30a such that the electrode groups face each other. Further, the drive device 3 has a drive circuit 32 provided in the case 30 to drive the display medium 2.

The discrete electrode group 31 is composed of a plurality of discrete electrodes 31b consisting, for example, of a transparent conductive film such as indium tin oxide (ITO). The plurality of discrete electrodes 31b are arranged in matrix shape through transparent insulating regions 31a and driven by a switching element such as a thin film transistor provided on the same or separate substrate.

The drive circuit 32 has a signal input terminal 32a leading to the outside or the end surface of the case 30. The drive circuit 32 applies an electric field to the display elements 21 by applying DC voltage to the discrete electrode groups 31 in response to an image signal S supplied through the signal input terminal 32a, and as a result, causes the display elements 21 to display selected optical properties.

Figure 3:
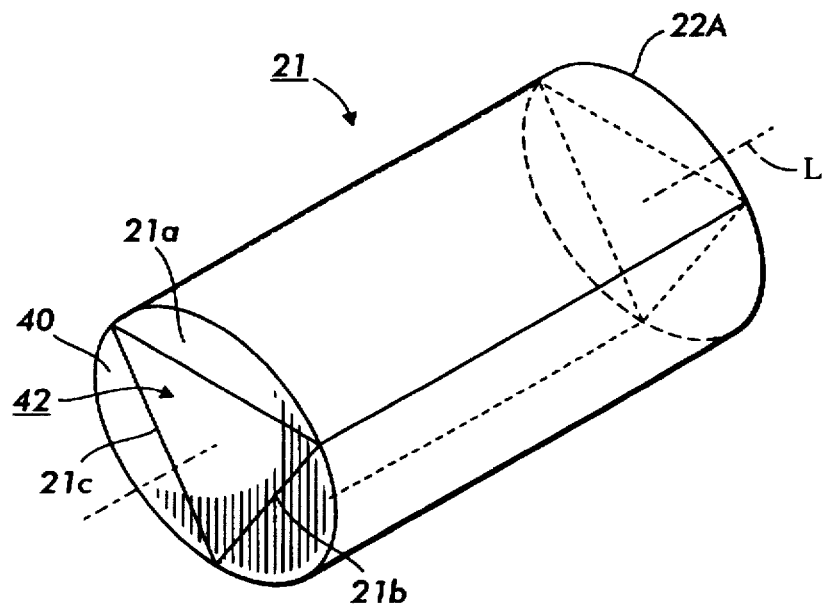
FIG. 3 is a perspective view showing a first embodiment of a display element according to the present invention.

FIG. 3 is a perspective view showing a display element 21. This display element 21 has a cylindrical shape of a predetermined size (in which a diameter is equal to a length, for instance), and its circumferential surface 22A is composed of a clear material to allow viewing of a plurality of display surfaces 21a, 21b, and 21c which are classified by different optical properties and are arranged in a circumferential direction around a longitundinal axis L. For example, in a display employing grey scale display surface 21a would be black while display surface 21b would be white and display surface 21c would be some intermediate value between black and white. In a display utilizing highlight color display surface 21a would be black while display surface 21b would be white and display surface 21c would be any color, such as red or green, chosen by the manufacturer of the display. In a display using full color display surface 21a would be red while display surface 21b would be green and display surface 21c would be blue.

As can be seen in FIG. 3, the display element 21 is constructed of a multisided display surface 42, in this example a triangular column shaped surface, encased within a clear cylinder 40. It should be noted that the longitudinal axis L is the longitudinal direction for both the multisided display surface 42 and the clear cylinder 40. For ease of operation, the multisided display surface 42 is composed of sides having equal widths. That is, within the multisided display surface 42, display surfaces 21a, 21b, and 21c present roughly equal surface areas and viewing areas.

Figure 4:
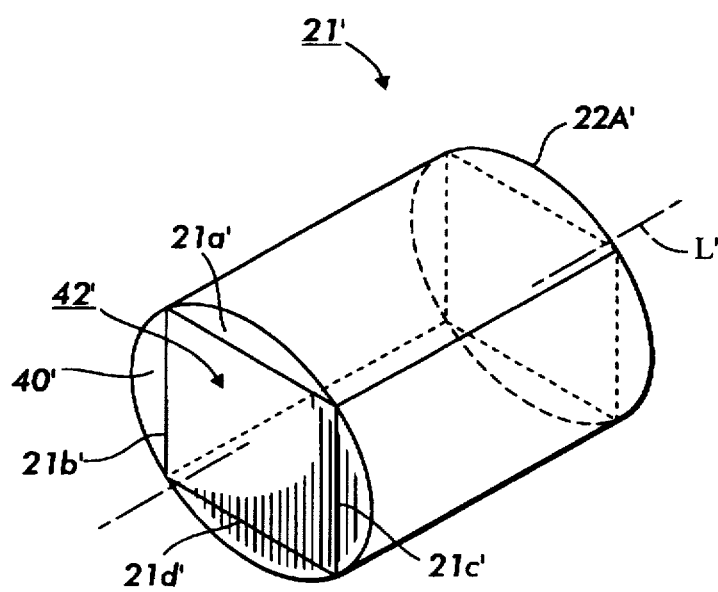
FIG. 4 is a perspective view showing a second embodiment of a display element according to the present invention.

FIG. 4 is a perspective view showing an alternate display element 21'. This display element 21' also has a cylindrical shape of a predetermined size (in which a diameter is equal to a length, for instance), and its circumferential surface 22A' is also composed of a clear material to allow viewing of a plurality of display surfaces 21a', 21b', 21c', and 21d' classified by different optical properties arranged in a circumferential direction around a longitudinal axis L'. For example, in a display employing grey scale display surface 21a' would be black while display surface 21b' would be white and display surfaces 21c' and 21d' would be two differing intermediate values between black and white. In a display utilizing highlight color display surface 21a' would be black while display surface 21b' would be white and display surfaces 21c ' and 21d' would be any two colors, such as red or green, chosen by the manufacturer of the display. In a display using full color display surface 21a' would be red while display surface 21b' would be green and display surface 21c' would be blue and display surface 21d' would be black.

As can be seen in FIG. 4, the display element 21' is constructed of a multisided display surface 42', in this example a square column shaped surface, encased within a clear cylinder 40'. Again, the longitudinal axis L' is the longitudinal direction for both the multisided display surface 42 and the clear cylinder 40. For ease of operation, the multisided display surface 42' is composed of sides having equal widths. That is, within the multisided display surface 42', display surfaces 21a', 21b', 21c' and 21d' present roughly equal surface areas and viewing areas.

It is important to note that both FIG. 3 and FIG. 4 show two similar embodiments of a display element 21 with specific examples of what each display surface contains. However, the multisided display surface 42 need not be limited to three or four sides and the optical characteristics on the sides are not limited to black, grey, white, and selections of colors. Any individual side can have any optical property such as black, white, grey, color, polarization, birefringence, phase retardation, light absorption, light scattering, and light reflection. As such any display element 21 can comprise any combination of the above properties.

Figure 5A:
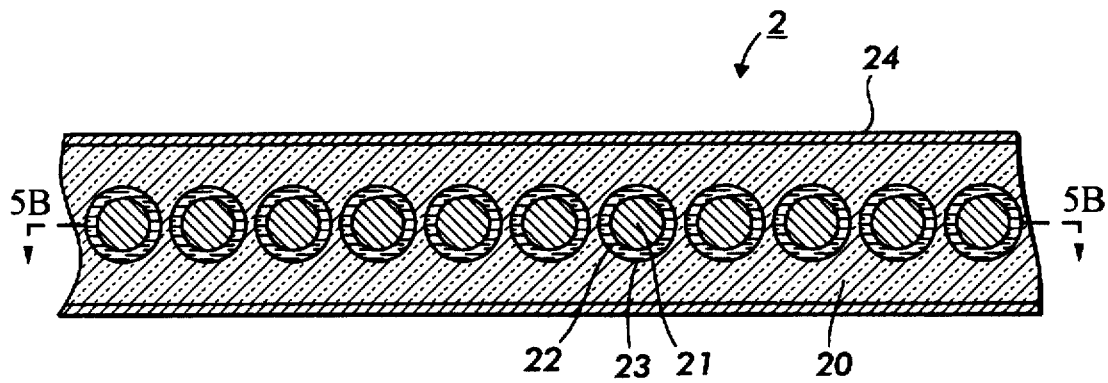
FIG. 5(a) is a view taken along the thickness direction of a display medium.
Figure 5B:
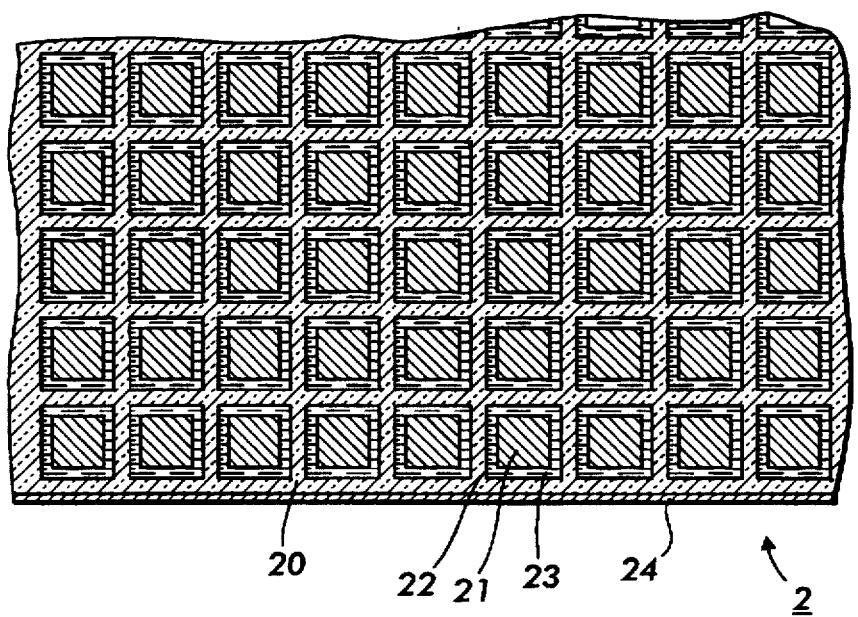
FIG. 5(b) is a sectional view taken along a line C—C in FIG. 5(A)
Figure 6:
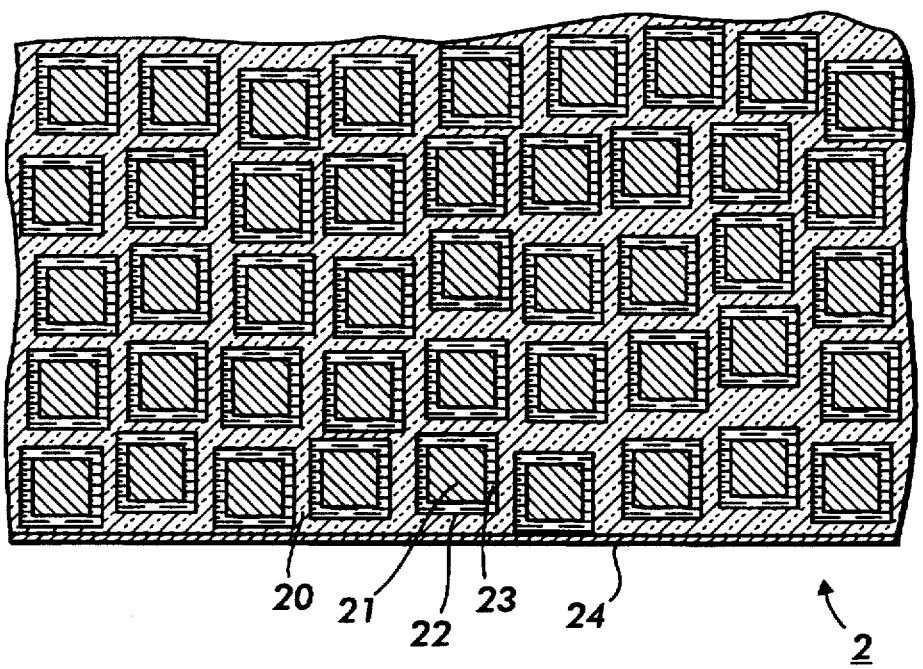
FIG. 6 is a view showing the array of display elements in another manner according to the present invention.

FIGS. 5(a) and 5(b) show an array of the display elements 21. FIG. 5(a) is a view taken along the thickness direction of the display medium 2, and FIG. 5(b) is a sectional view taken along a line C—C in FIG. 5(a). The display elements 21 are regularly arrayed in matrix shape in the support 20. Incidentally, the display elements 21 may be arrayed irregularly as shown in FIG. 6.

Figure 7A:
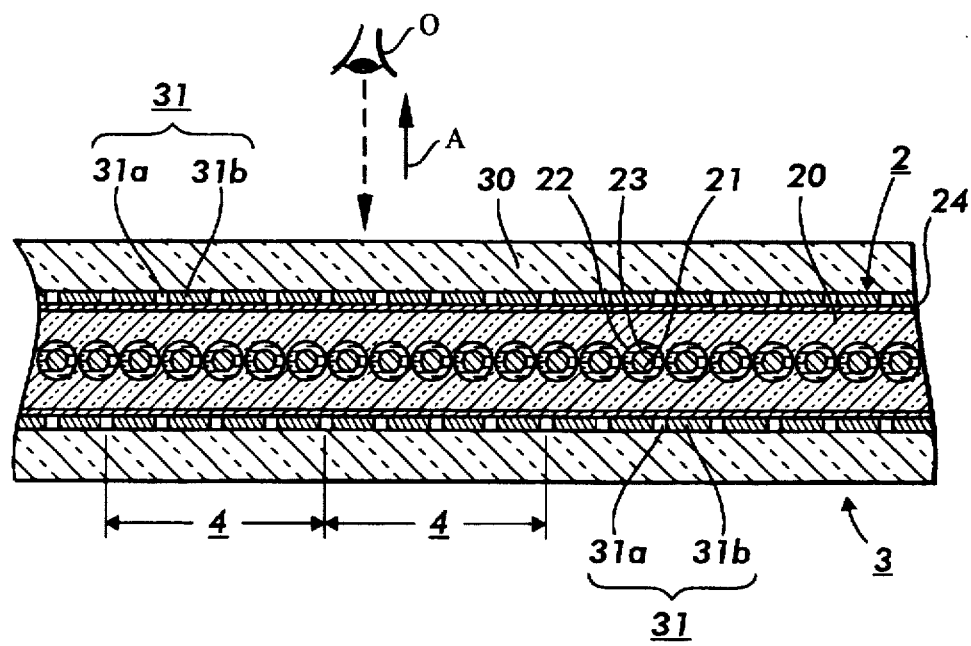
FIG. 7(a) is a cross-section view and FIG. 7(b) is a plan view.
Figure 7B:
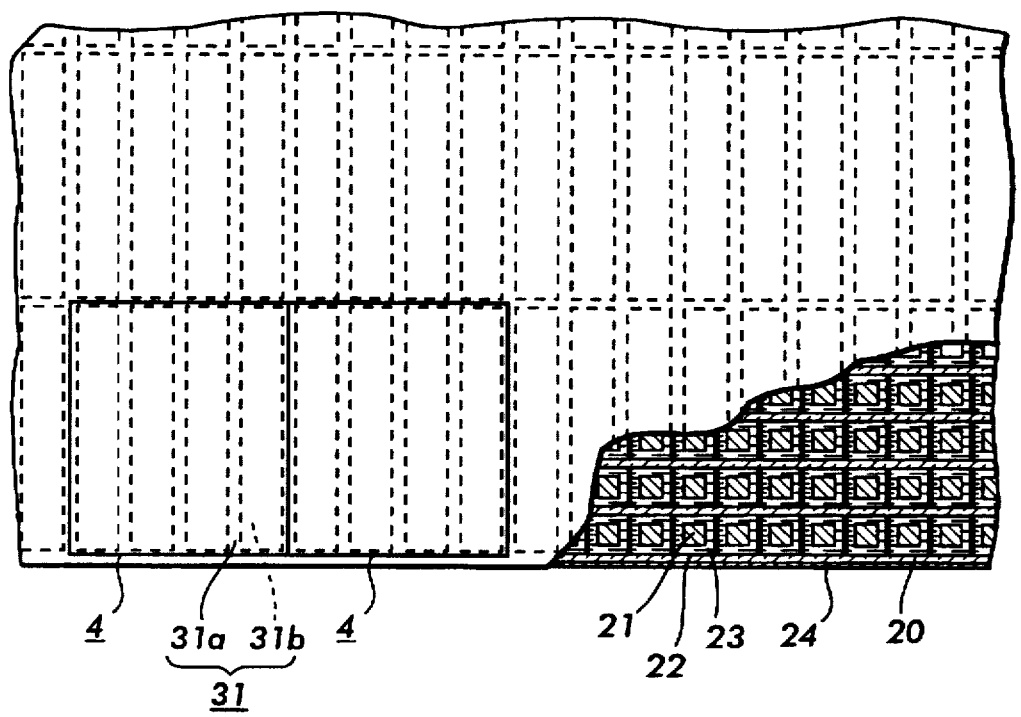

FIGS. 7(a) and 7(b) is a view showing the positional relation between the display elements 21 and the discrete electrode groups 31. FIG. 7(a) is a view taken along the thickness direction of the display medium 2, and FIG. 7(b) is a view taken along the visible side A. The discrete electrode groups 31 are arranged so as to be brought into contact with the display medium 2. However, the display will still function if a small air gap is left between the discrete electrode groups 31 and the display medium 2.

One picture element 4 is composed of an array n×m display elements 21 driven by a multiplicity of discrete electrodes 31b. In this embodiment, as shown in FIGS. 7(a) and 7(b), one picture element 4 is driven by eight discrete electrodes 31b consisting of four upper electrodes and four lower electrodes. Additionally, in this embodiment, one picture element 4 contains a 5×5 matrix of display elements 21. Electric fields exist in four directions, i.e., upward, rightward, leftward and downward electric fields are uniformly applied to n×m display elements 21 constituting the picture element 4 according to a combination of plus (+) and minus (−) of DC voltage applied to eight discrete electrodes 31b for driving one picture element 4. Alternative embodiments also exist which employ different numbers of discrete electrodes 31b driving arrays of display elements 21 which are either larger or smaller than the array used in this example.

FIG. 8 is a schematic view for explaining the display operation of one display element 21. For the purposes of explanation, a display element 21' with four display surfaces 21a', 21b', 21c', and 21d' will be used. Operation of display elements 21' with different numbers of display surfaces will be similar.

Figure 8A:
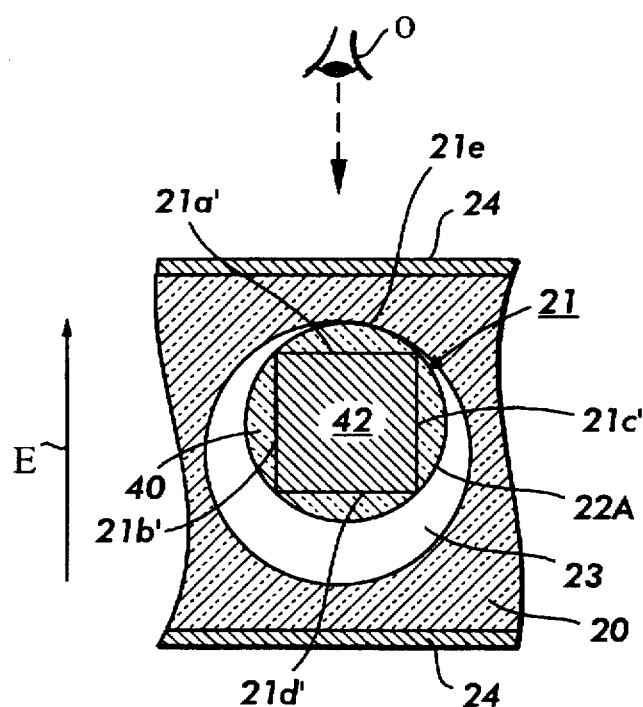
FIGS. 8(a)–8(d) show application of different electrical fields.
Figure 8B:
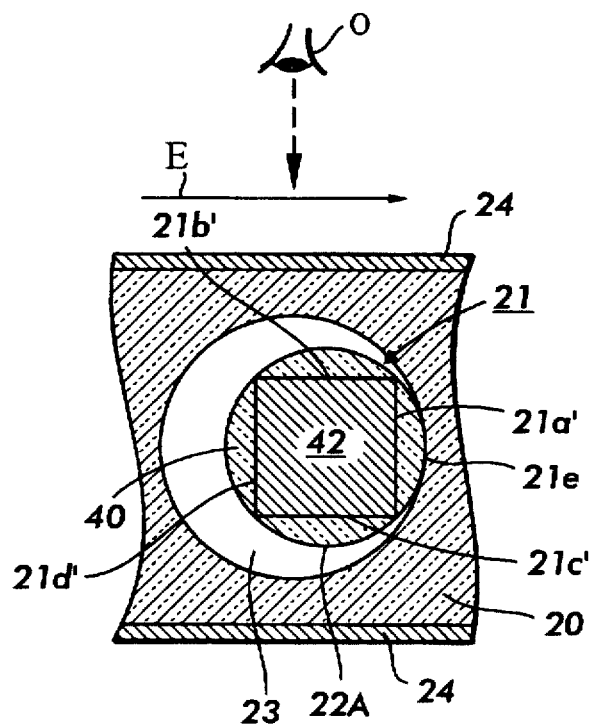
Figure 8C:
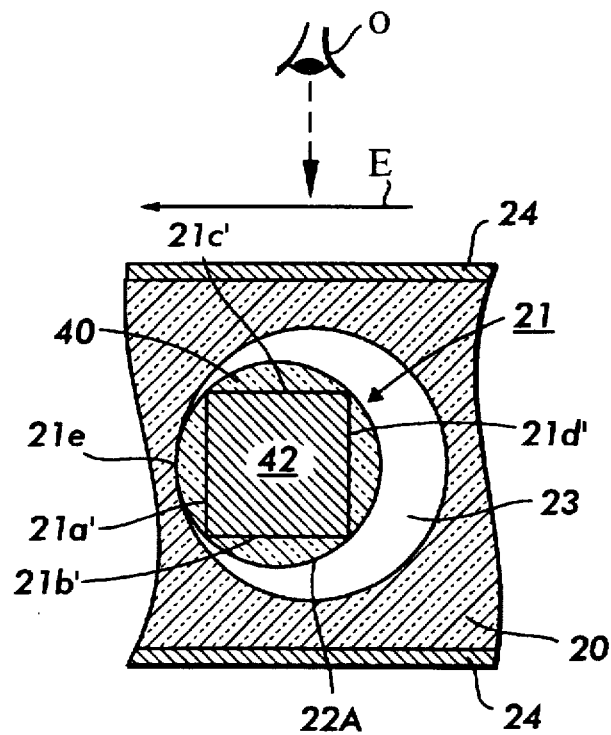
Figure 8D:
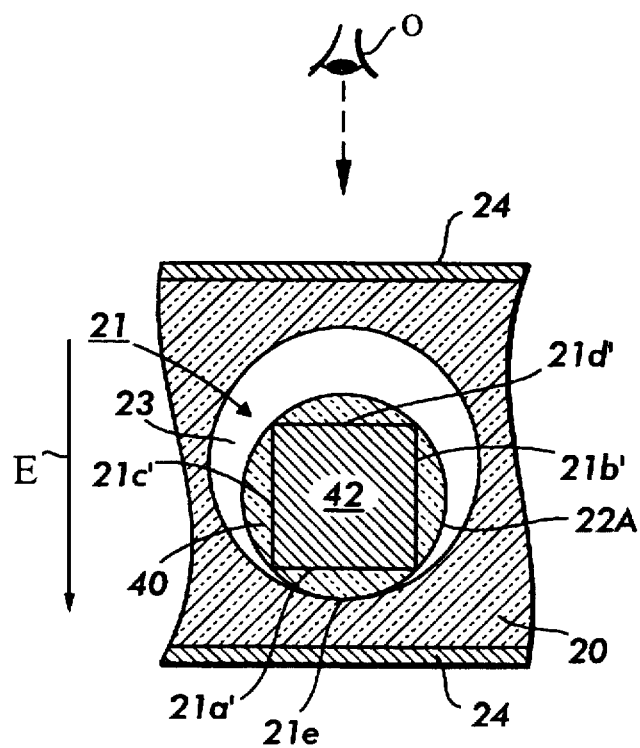

FIGS. 8(a) through 8(b) show four display states of the display element 21'. FIG. 8(a) shows a first display state, FIG. 8(b) shows a second display state, FIG. 8(c) shows a third display state, and FIG. 8(d) shows a fourth display state, respectively. When an electric field E is applied from the outside of the display medium 2, the display element 21' is turned correspondingly in the direction of the electric field E. Then, the display element thus turned is electrically migrated through the liquid 23 and then attached to the inner surface of the cavity 22. Among four optical properties on the four display surfaces 21a', 21b', 21c', and 21d' of the display element 21', an optical property selected by the image signal is visible from the visible side A through the transparent support 20 (and the transparent case 30).

As shown in FIG. 8(a), when the electric field E is applied in an upward direction, the position of the semi-circular part 21e is shifted to the upper side, and display surface 21a' is turned upward. The display element 21' is migrated upward and, as a result, display surface 21a' is visible to an observer O located above the display device 1, as shown in FIG. 8(a).

As shown in FIG. 8(b), when the electric field E is applied in a rightward direction, the position of the semi-circular part 21e is shifted to the right side, and display surface 21b' is turned upward. Display element 21' is migrated to the right and, as a result, display surface 21b' is visible to the observer O.

As shown in FIG. 8(c), when the electric field E is applied in a leftward direction, the position of the semi-circular part 21e is shifted to the left side and display surface 21c' is turned upward. The display element 21' is migrated to the left and as a result the display surface 21c' is visible to the observer O, as shown in FIG. 8(c).

When the electric field E is applied in a downward direction, the position of the semicircular part 21e is shifted to the lower side, and display surface 21d' is turned upward. The display element 21' is migrated downward and as a result the display surface 21d' is visible to the observer O, as shown in FIG. 8(d).

When the display element 21' is turned and once attached to the inner surface of the cavity 22, the attached state of the display element 21', i.e., its display state is held by the action of an attraction force such as van der Waals force and electrostatic force acting between the circumferential surface 22A' of the display element 21' and the inner surface of the cavity 22, even after the electric field is removed.

Figure 9:
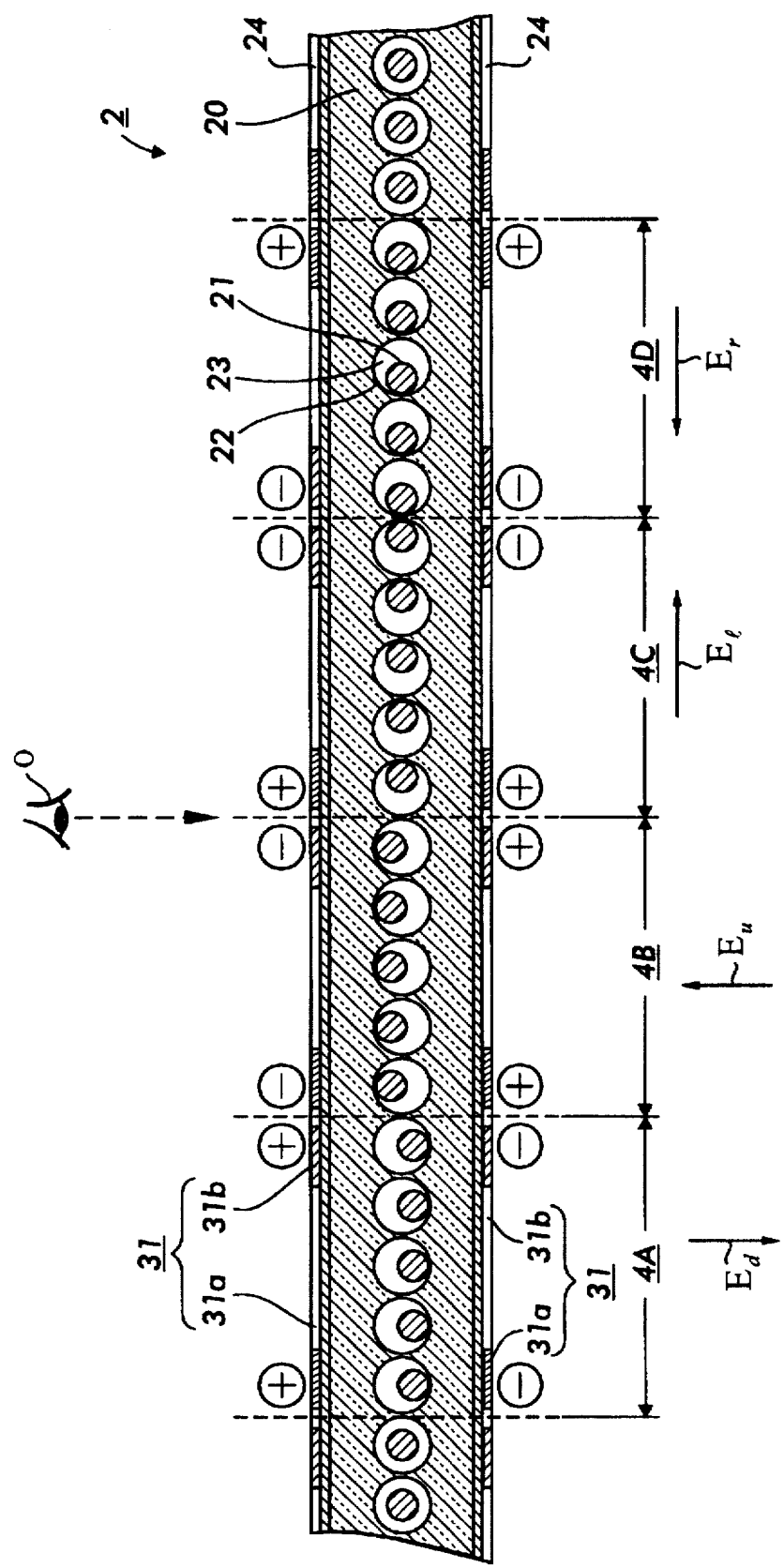
FIG. 9 is a schematic view for explaining the display operation of a display medium according to the present invention.

FIG. 9 is a view showing the display operation of the display medium 2. An operator mounts a display medium 2, which requires rewriting, in the drive device 3, as shown in FIG. 1. Namely, the display medium 2 is mounted in the opening 30a until the display medium 2 is brought into contact with the contact portion 30b (FIG. 2b). When the signal input terminal 32a of the drive circuit 32 of the drive device 3 receives an image signal S, the drive circuit 32 applies DC voltage to the discrete electrode groups 31 according to the received image signal S, such as the example shown in FIG. 9. Although plus (+) and minus (−) symbols are given in FIG. 9 so that the direction of electric field is easy to understand, it is not necessary to distribute voltage into both polarities as a matter of fact. For instance, voltage could be switched between +30v and 0V.

An electric field in the same direction is applied to n×m pieces (5×5) of display elements 21' which form one picture element 4. Then, the same display surfaces 21a', 21b', 21c' or 21d' of the display elements 21' are turned upward and, as a result, the display elements 21' display the same optical property to the observer O.

As shown in FIG. 9, a picture element 4A, has a downward electric field $E_d$ applied, which allows display surface 21d' to be viewed by the observer O. The downward electric field is applied by setting the uppermost electrodes 31 of the electrode pairs in picture element 4A to a higher potential than the lower electrodes 31.

In picture element 4B, an upward electric field $E_u$ is applied, which allows display surface 21a' to be viewed by the observer O. The upward electric filed $E_u$ is applied by setting the uppermost electrodes 31 of the electrode pairs in picture element 4B at a lower potential than the downward electrodes.

In picture element 4C, a rightward electric field $E_r$ is applied, which allows display face 21b' to be viewed. The rightward electric filed $E_r$ is applied by setting the rightmost electrodes 31 of the picture element 4C to a lower potential than the leftward electrodes 31.

In picture element 4D, a leftward electric field $E_l$ is applied, which allows display surface 21c' to be viewed. The leftward electric field $E_l$ is applied by setting the rightmost electrodes 31 of the picture element 4D to a higher potential than the leftward electrodes 31.

Figure 10A:
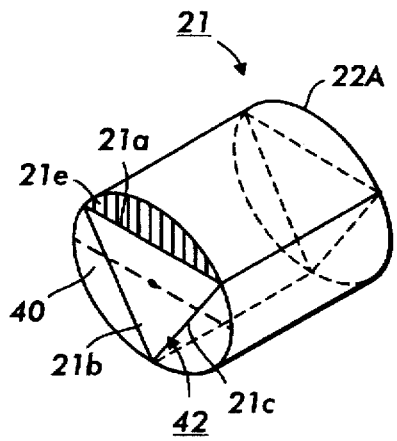
FIG. 10(a) is a perspective view showing a display element.
Figure 10B:
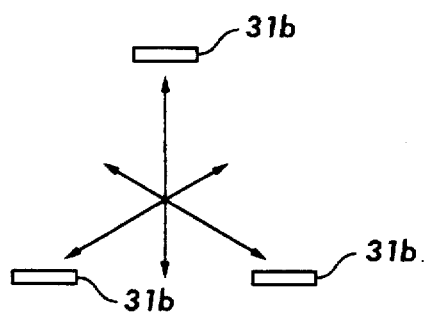
FIG. 10(b) is a view for explaining the directions of the application of electric field.
Figure 10C:
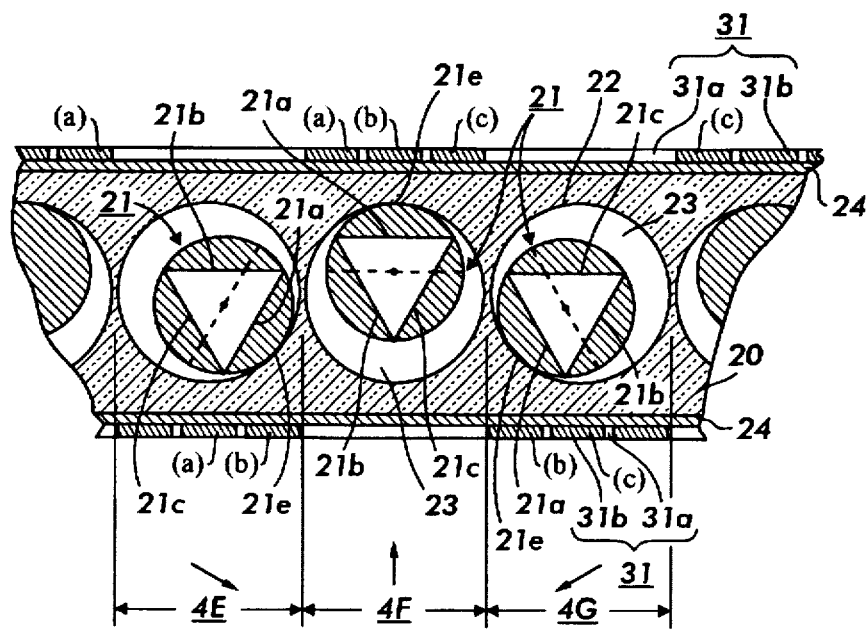
FIG. 10(c) is a view showing the positional relation between display elements and discrete electrode groups.

FIG. 10 is a view showing another embodiment according to the present invention. FIG. 10(a) is a perspective view showing a display element 21, previously shown in FIG. 3, FIG. 10(b) is a view for explaining the directions of the application of electric field, and FIG. 10(c) is a view showing the positional relation between display elements and discrete electrode groups.

Display element 21 shown in FIG. 3 and FIG. 10(a) is classified by three optical properties on the three display surfaces 21a, 21b, 21c. The circumference of the display element 21 has an electrical anisotropy. The part having the most positive charge, display surface 21e, has a predetermined positional relation with the display surfaces 21a, 21b, 21c. For instance, display surface 21a is formed in the center of the part 21e having the most positive charge, and display surface 21c and display surface 21b are formed to extend over the remaining area.

Picture elements 4E, 4F, 4G are composed of three display elements 21, and each display element 21 is driven by three discrete electrodes 31b positioned at three vertexes of a regular triangle. Namely, the potentials of two of three discrete electrodes 31b are set to be equal with each other, while the potential of the remaining discrete electrode 31b is set to be different from the above potentials. By so doing, an electric field in the direction corresponding to an image signal is selected among electric fields in six directions shown in FIG. 10(b) and then applied. For instance, if the upwards most electrode 31b is set to be greater than the two other discrete electrodes 31b than an electric field will be generated in an upward direction. Conversely, if the upwards most electrode 31b is set to be less than the other two electrodes an electric field will be generated in a downward direction. If the rightmost electrode 21b is set to be higher than the other two electrodes 31b than an electric field will be generated in a right downward direction. The remaining electric fields can be generated in a like manner.

Accordingly, the display elements 21 in the display medium 2 have a positional relation with the discrete electrodes 31b, as shown in FIG. 10(c). The left-hand display element 21 is driven by three discrete electrodes 31b denoted by (a), the central display element 21' is driven by three discrete electrodes 31b denoted by (b), and the right-hand display element 21' is driven by three discrete electrodes 31b denoted by (c).

For instance, as shown in FIG. 10(c), picture element 4E, has a lower rightward electric field applied to it. The position of the semi-circular part 21e having the most positive charge is shifted to the lower right side and display surface 21b is turned upward. The display element 21 is migrated to the lower right.

Picture element 4F, has an upward electric field is applied to it. The position of the semi-circular part 21e having the most positive charge is shifted to the upper side, and display surface 21b is turned upward. The display element 21 is migrated upward.

Picture element 4G, has a lower leftward electric field applied to it. The semi-circular part 21e having the most positive charge is shifted to the lower left side, and display surface 21c is turned upward. Display element 21 is migrated to the lower left.

Since the display device having the above constitution employs the display elements 21 each having three display surfaces 21a, 21b, and 21c classified by three optical properties, a grey scale, highlight color or three-color display is enabled.

When update image information is successively written in the display medium 2, shown in either FIG. 9 or FIG. 10 at a predetermined switching rate (e.g., 20 ms), the image information is seen by the observer O. If drive operation is stopped whenever an image which needs to be preserved is obtained, the display medium keeps displaying the image because of its memory properties even though power is not applied. Furthermore, after the display medium 2 is separated from the drive device 3, the display medium 2 may be used as a substitute for paper as well.

If the same voltage is applied to, for instance, all the corresponding discrete electrode groups 31 in the display medium 2, in which image information is written, while the display medium 2 is mounted in the drive device 3. Then, the same display surfaces, either 21a, 21b, 21c or 21d, of all the display elements 21 of each picture element 4A, 4B, 4C and 4D are turned upward. All of the display elements 21 will then display the same optical property to the observer O, thus resulting in erasing original image information.

The display 1 uses groups of matrix-shaped discrete electrode groups 31 which are adapted to form combinations of electrodes 31 thereby enabling a two-dimensional drive in a matrix shape. Therefore, because only electric control is used to write images on the display it is possible to write images in the display medium 2 at high speed. Accordingly, it is possible to provide a display device having rapid response times.

Since the display device 1 employs the display elements 21 each having multiple display surfaces classified by differing optical properties, a full-color display is enabled. Further, a compound color with an intermediate tone is easily displayed by varying the display area rate of each optical property. This principle is also applicable to a display employing grey scale or a black and white display with highlight color. Also, it is possible to provide a display device having excellent properties to cope with color and multi-color display. Futhermore clear color display is enabled by suitably selecting the color on the display surface of each display element 21. This results in good color saturation and an image of high quality. A more thorough discussion of this is contained in copending U.S. application Ser. No. 08/XXX,XXX titled "Twisting Cylinder Displays" by Sheridon et. al. filed on the same date as this application.

When each display element 21 is attached to the inner surface of the cavity 22 according to, for example, an electrophoresis phenomenon, the attached state of the display elements is held by the action of attraction forces such as electrostatic force and van der Waals force. Accordingly, it is possible to provide a display device having memory properties, in which the display state is held even after power is turned off. Furthermore, if the displayed image becomes unnecessary, then the display device may be repeatedly used by mounting the display device in the drive device 3 again. As a result, it is possible to obtain a savings of electric power when displaying an image.

Since the display medium 2 has memory properties, rapid response, the ability to provide a multi-optical property display, an image of high quality and properties to attain saving of electric power, its characteristic to substitute for paper is heightened, and hence, this display medium is able to make a contribution to the protection of the global environment.

Since the display medium 2 has no discrete electrode group (the electrode groups are manufactured as part of the drive device 3), the constitution of the display medium 2 is simplified and its cost is reduced. Accordingly, it is possible to obtain cost reductions for the generation of a plurality of static images.

Incidentally, the present invention is not limited to the above constitution, and may be embodied in various manners.

For instance, only a required portion of the case 30 through which the display elements 21 are viewed need be formed as a transparent portion. Otherwise the case 30 may be made of an opaque material.

A case 30 of a type which may be opened or closed, such as a case in book or binder shape, is possible.

A display element 21 of any prismatic shape such as a quadrangular or hexagonal prism is also possible.

A method of manufacturing a sheet-like display medium for holding a displayed image is also provided. This method comprises the steps of manufacturing a plurality of display elements of a cylindrical, prismatic or other columnar shape, each of which has an electrical anisotropy and has an outer surface provided with a plurality of display areas classified by a plurality of optical properties in a circumferential direction, supporting the plurality of display elements by a transparent sheet-like rubber member, in which an image display surface is formed on at least one surface, by two-dimensionally arraying the plurality of display elements in the sheet-like rubber member such that the plurality of display areas of the plurality of display elements are in parallel with the image display surface, and swelling the sheet-like rubber member by immersing the sheet-like rubber member in light-transmitting liquid to thereby hold the plurality of display elements in the light-transmitting liquid in a suspended state. This technique is known for manufacturing gyricon displays and the details thereof are disclosed in U.S. Pat. No. 4,126,854 by Sheridon titled "Twisting Ball Panel Display", U.S. Pat. No. 4,143,103 by Sheridon "Titled Method of Making a Twisting Ball Panel Display" and copending application "Twisting Display" (Attny Docket No. 92105) Ser. No. 08/716,672, filed Sep. 13$^{th}$, 1996, and all herein incorporated by reference.

However, in a gyricon display with elements which are not spherical, and which have more observable states than the simple bichromal cylinders which are described in "Twisting Display" (Attny Docket No. 92105) Ser. No. 08/716,672, filed Sep. 13$^{th}$, 1996, it is essential that all the display elements 21' be aligned in the same direction. FIG. 11 illustrates the problem that may occur if all of the display elements 21' are not aligned in the same direction.

Figure 11A:
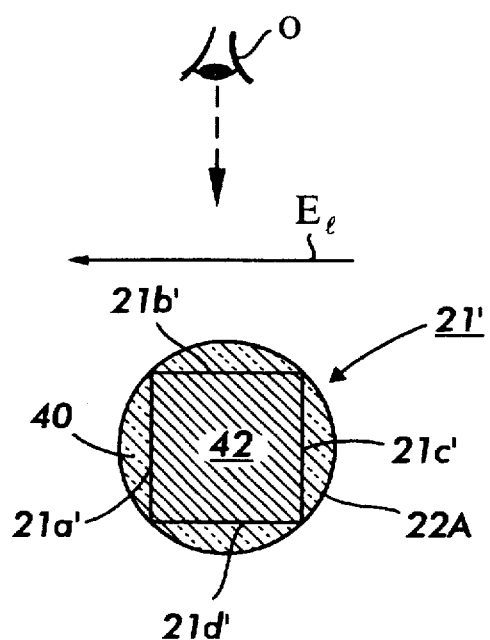
FIG. 11(a) shows a display element in a first orientation and FIG. 11(b) shows a display element in a second orientation.

FIG. 11(a) shows a side view of a display element 21' with four display surfaces 21a', 21b', 21c', and 21d' in one of two possible alignments. The display surface 21a' has the highest charge density and points in the direction of the leftward electric field $E_L$. The display surfaces 21a', 21b', 21c', and 21d' proceed in a clockwise direction around the circumference of the display element 21' beginning with display surface 21a' and ending with display surface 21d'. The display surface 21b' is viewable to the observer O.

Figure 11B:
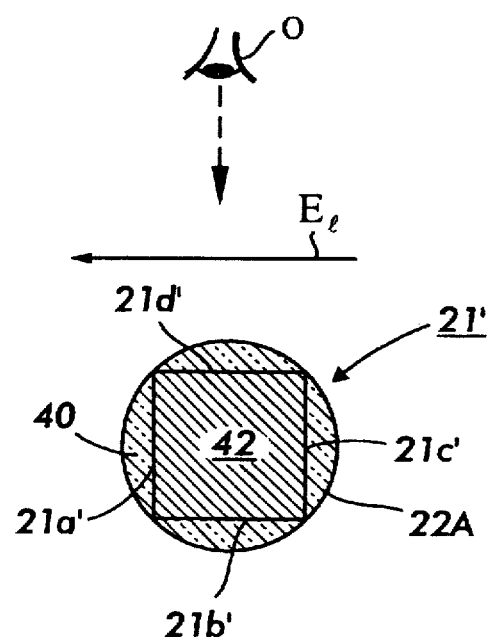

FIG. 11(b) shows a side view of a display element 21' with four display surfaces 21a', 21b', 21c', and 21d' in the other of two possible alignments. This alignment is achieved when for instance, a display element 21' is flipped end for end. The display surface 21a' has the highest charge density and points in the direction of the leftward electric field $E_L$. The display surfaces 21a', 21b', 21c', and 21d' proceed in a counter-clockwise direction around the circumference of the display element 21' beginning with display surface 21a' and ending with display surface 21d'. The display surface 21d' is viewable to the observer O.

As is seen in seen in FIGS. 11(a) and 11(b), when the orientation of one display element 21' is different from another display element 21' then different display surfaces become viewable by the observer O as the display element is rotated by an electric field E. In order to insure proper operation of the display medium 2, it is important that all display elements within the display medium 2 have known, identical orientations. Therefore the manufacture of complex display elements 21' must consider the orientation of display elements 21' in the manufacture of the display medium 2. Two methods will be discussed. The first preserves a specific orientation produced during manufacturing of the display elements 21'. The second introduces a characteristic into the display element that allows for the display elements to be aligned together during the manufacturing of the display sheet 2.

Figure 12:
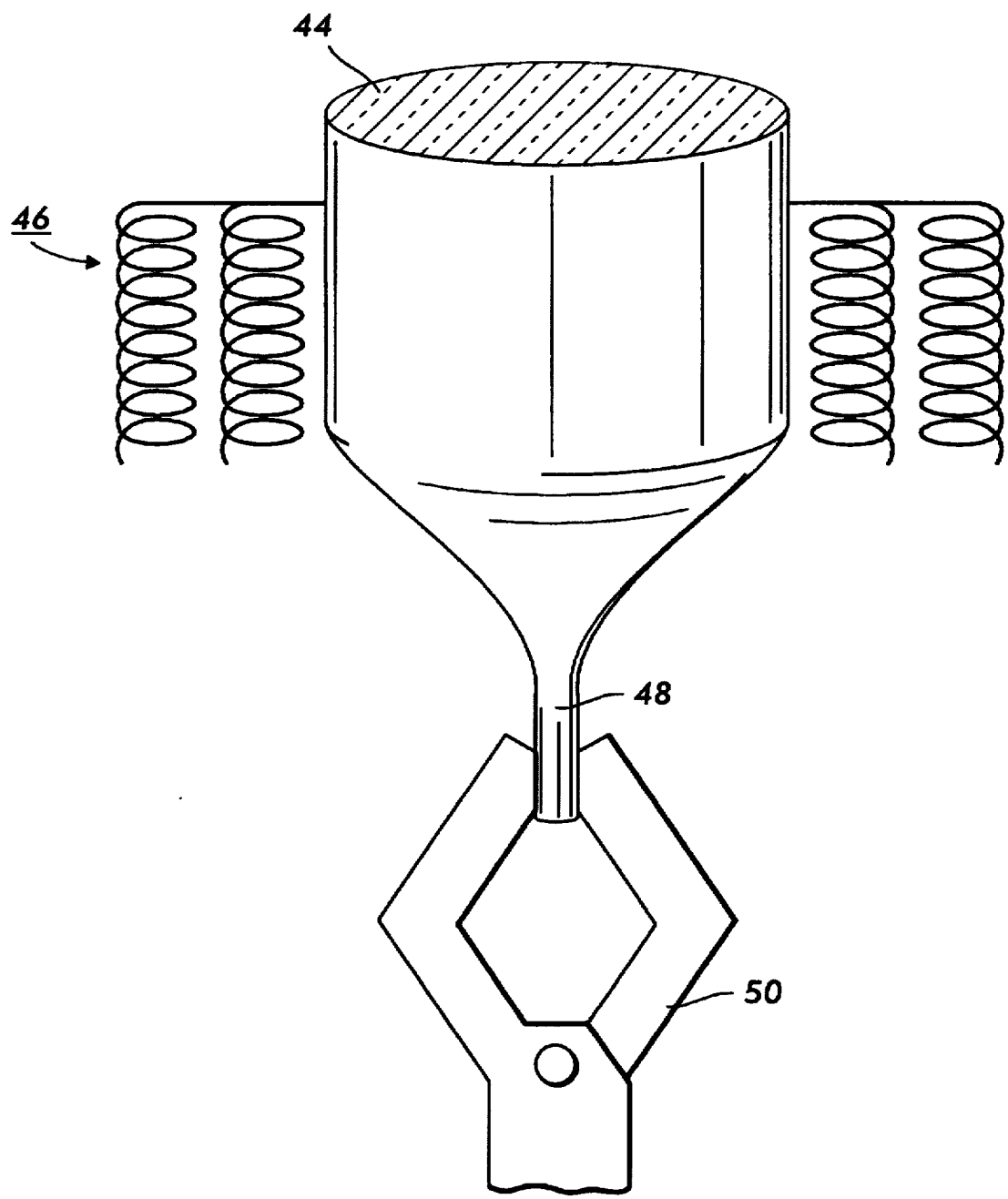
FIG. 12 shows a method of producing filaments to be used in making display elements.

One method of producing display elements 21 is to assemble a large format display element 44 having the properties shown in either FIG. 3 or FIG. 4. For example a large format display element 44 could be constructed from plastic or glass having a ½ inch diameter. It is important that the particular glass or plastics chosen to construct the large format display element 44 be solid at room temperature, become viscous at elevated temperatures without undergoing decomposition, and that all the materials chosen have similar viscosity/temperature curves. After assembly of the large format display element 44, filaments 48 can be pulled from the large format display element 44 as shown in FIG. 12. The large format display element 44 is heated at one end by a heater 46. A pulling device 50 is attached at the heated end of the large format display element 44 and slowly draws filaments 48 from the large format display element 44. The filaments 48 retain the characteristics of the large format display element 44 they were drawn from. This technique is well known and used in the production of glass fibers for fiber optic bundles. Once the filaments 48 have been drawn and cooled they can be stored and used for production of display medium 2.

Alternate processes for producing filaments 48 are also possible such as using injection molding or extrusion techniques.

Figure 13A:
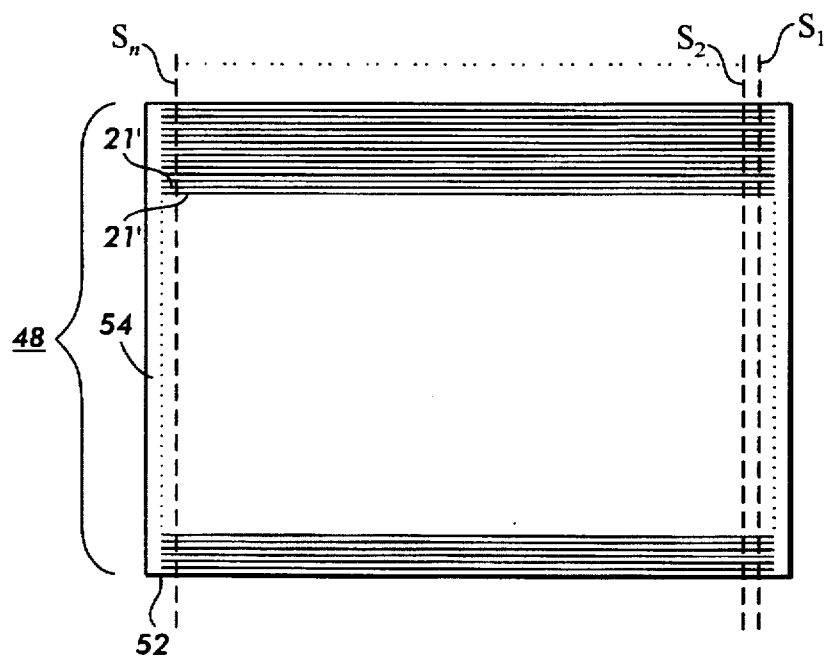
FIG. 13(a) shows a top view and FIG. 13(b) shows a side view.
Figure 13B:
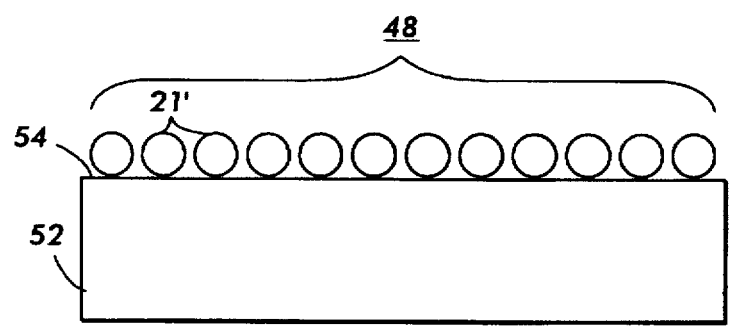

Once filaments 48 have been produced perhaps the simplest method to ensure uniform orientation of display elements 21, when assembling display medium 2, is to pack the filaments 48 closely together on a substrate 52 which has a sticky surface 54 to hold the filaments 48 in place as shown in FIG. 13. One convenient material for producing the sticky surface 54, is to use a layer of partially cured elastomer. Once a layer of closely packed filaments 48 is created on the substrate 52, the filaments 48 can then be separated into individual display elements 21' along separation lines $S_1$ through $S_n$. A focussed laser beam can be scanned over the layer of closely packed filaments along separation lines $S_1$ though $S_n$, vaporizing a short piece of the filament 48 as it passes over it. Repeated substantially parallel passes will divide the filaments 48 into display elements 21'. At this time a second layer of elastomer can be applied and cured as normally done. The rest of the processing sequence will remain the same as shown in FIGS. 14 and 15.

Figure 14:
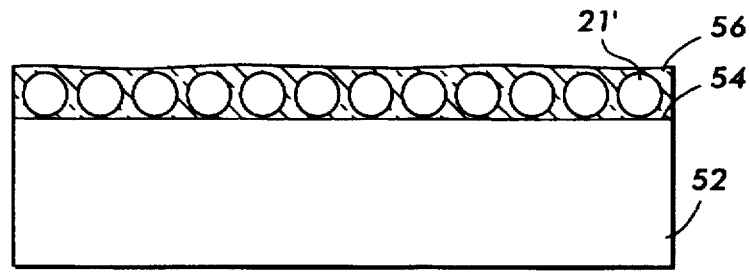
FIG. 14 shows a side view of a second step in assembling a display medium.
Figure 15:
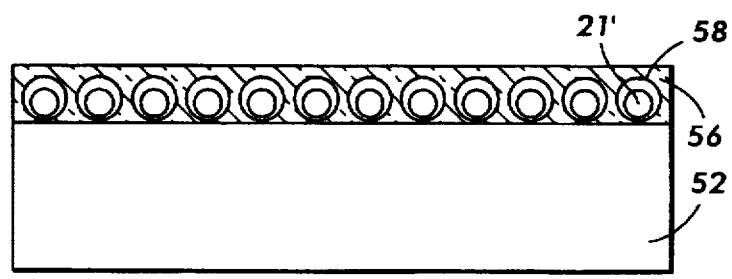
FIG. 15 shows a side view of a third step in assembling a display medium.

FIG. 14 shows a side view after of the substrate 52 after the filaments 48 have been divided into individual display elements 21' and an uncured optically transparent material 56 has been applied to completely surround the individual display elements 21'. As an example only, an uncured elastomer such as Dow Corning Sylgard 182 may be used. FIG. 15 shows a side view after the optically transparent material 56 has been cured and the substrate 52 has been immersed in a plasticizer to create cavities 58 as is known in the art.

Figure 16:
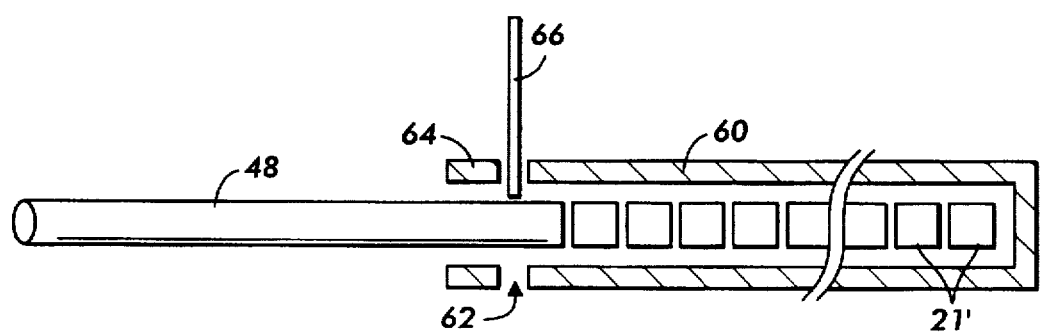
FIG. 16 shows a side view of a method to separate a filament into individual display elements and store them for later use while maintaining their orientational alignment.

Alternatively a filament may be separated into individual display elements 21' and stored while maintaining their orientational alignment as shown in FIG. 16. FIG. 16 shows a filament which is being inserted through a hollow guide tube 64 and into storage tube 60. Between the guide tube 64 and the storage tube 60 is a separation opening 62 which is used to provide access to the filament 48 for separating it into individual display elements 21' which are then stored in the storage tube 60. A variety of separation tools 66 can be used to separate the filament 48 such as using a cutting wheel to slice through the filament 48 or using a laser beam to vaporize a small portion of the filament 48 which is exposed in the separation opening 62.

The display elements 21' can then be placed on a substrate 52 with a sticky surface 54 as shown in FIG. 13 directly from the storage tube 60 except that the filaments 48 have already been divided into display elements 12'. The remaining processing steps shown in FIGS. 14–15 are identical.

While these approaches are feasible, they require keeping strict control of the display elements 21' while they are being stored to insure proper alignment in the manufacture of the display medium 2. It would be far more desirable to have a method which would allow for proper alignment of the display elements 21' without the need for keeping strict control over the display elements 21' until they can be confined in their cavities 58. One suggested method requires the manufacture of a display element 21' with a magnetic portion in the display element 21'. A magnetic portion could be incorporated into the multisided display surface in a number of ways. Looking at the display element pictured in FIG. 4, one of the display surfaces $21a'$, $21b'$, $21c'$, $21d'$ could be colored with a magnetizable pigment. While this method would be suitable for many colors, it would be especially suitable for a display surface colored with a black or very dark pigment. Another method of incorporating a magnetic portion is shown in FIG. 17.

Figure 17:
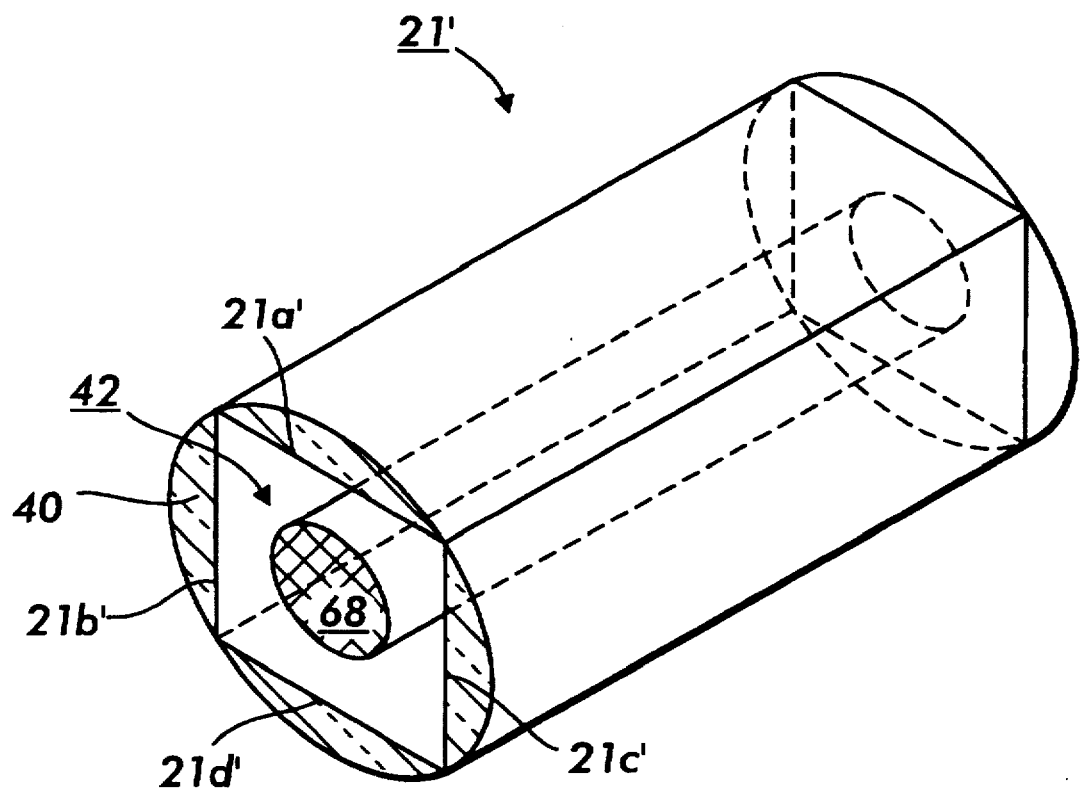
FIG. 17 shows a perspective view of an alternate embodiment of a display element.

FIG. 17 shows a perspective view of a display element with a magnetic portion 68 added to the core of the multisided display surface 42. Again the magnetic portion is formed by using a magnetizable pigment, that has the same viscosity/temperatures as the other elements, when forming the display element 21'. Although the magnetic portion 68 is shown as a cylinder centered in the core of the multisided display surface 42 it could be of any shape and located in any portion of the multisided display element 42 so long as it runs in the direction of the length of the multisided display element 42. It is not necessary for the magnet portion 68 to run the entire length of the multisided display element 42 so long as it is long enough to magnetize in a direction parallel to the length of the cylinder.

Figure 18:
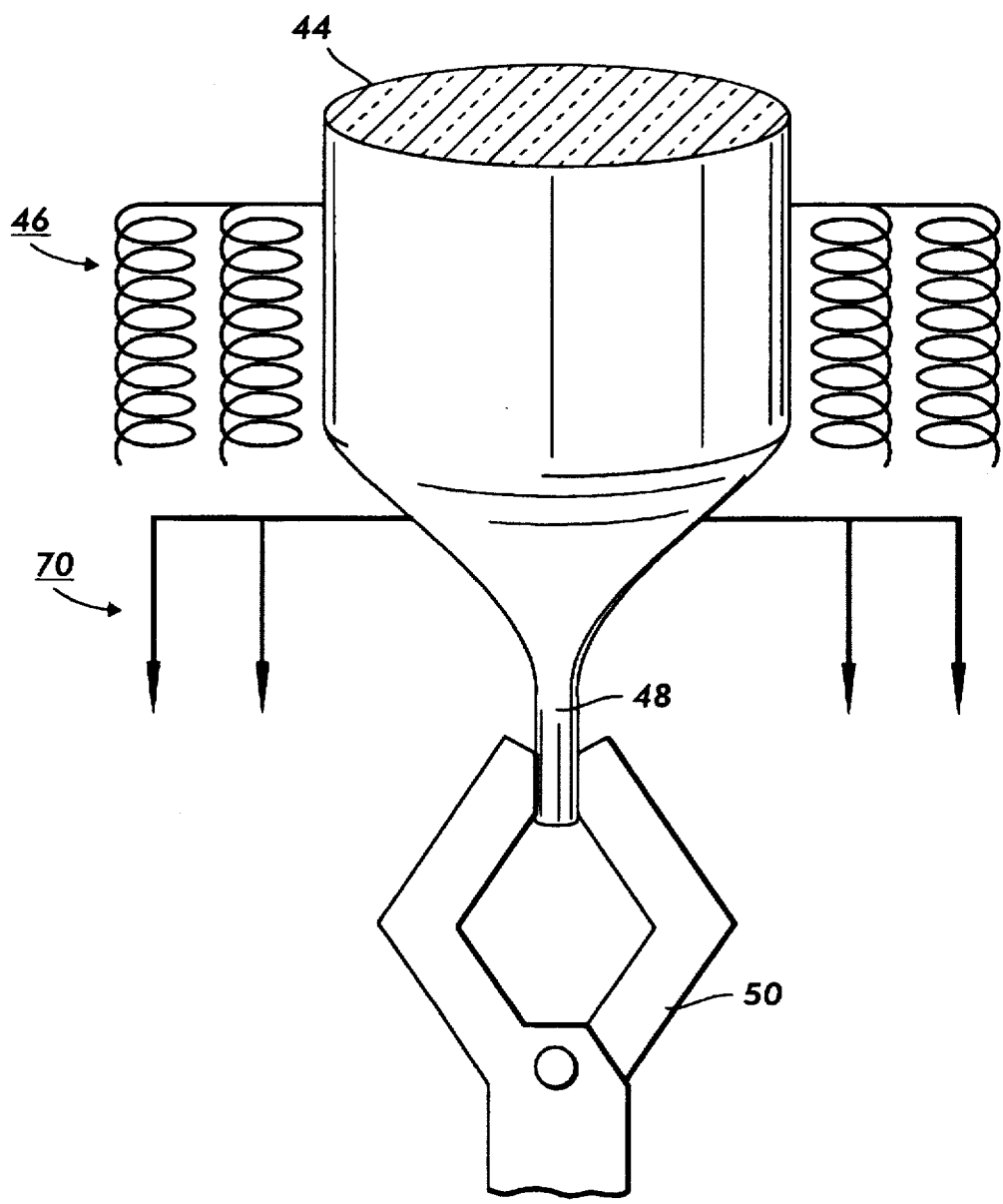
FIG. 18 shows an alternate method of producing filaments to be used in making display elements.

Manufacture of filaments 48 would remain essentially the same except for incorporation of the magnetic portion 68 and a magnetic field 70 used to magnetize the magnetic portion 68 as shown in FIG. 18.

Figure 19A:
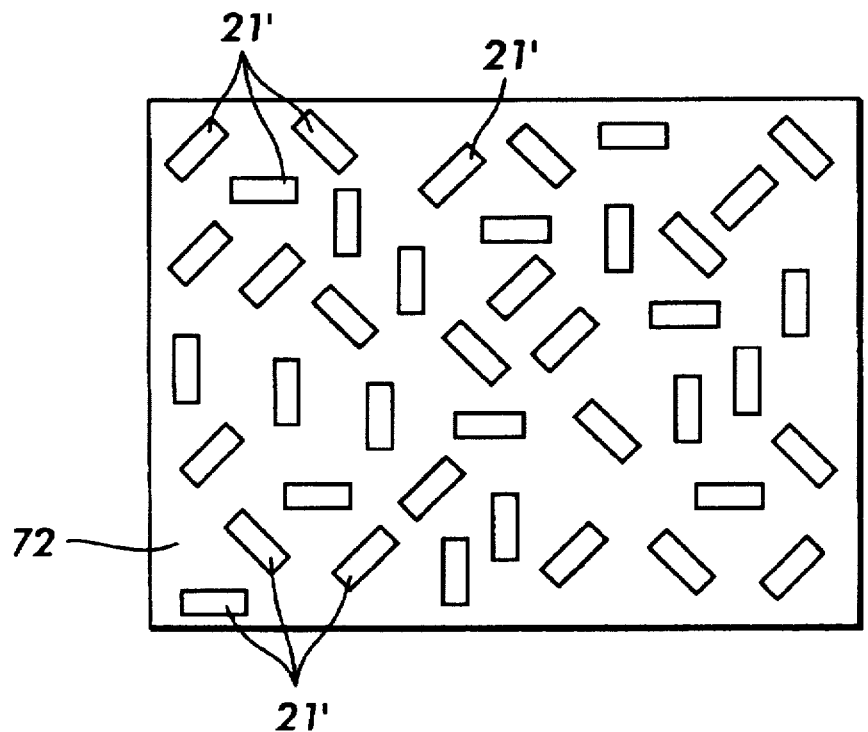
FIG. 19(a) shows a top view and FIG. 19(b) shows a side view.
Figure 19B:
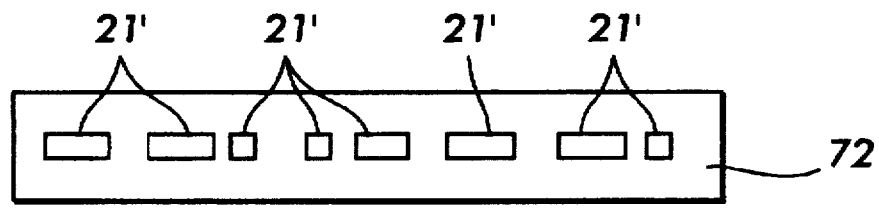
Figure 20A:
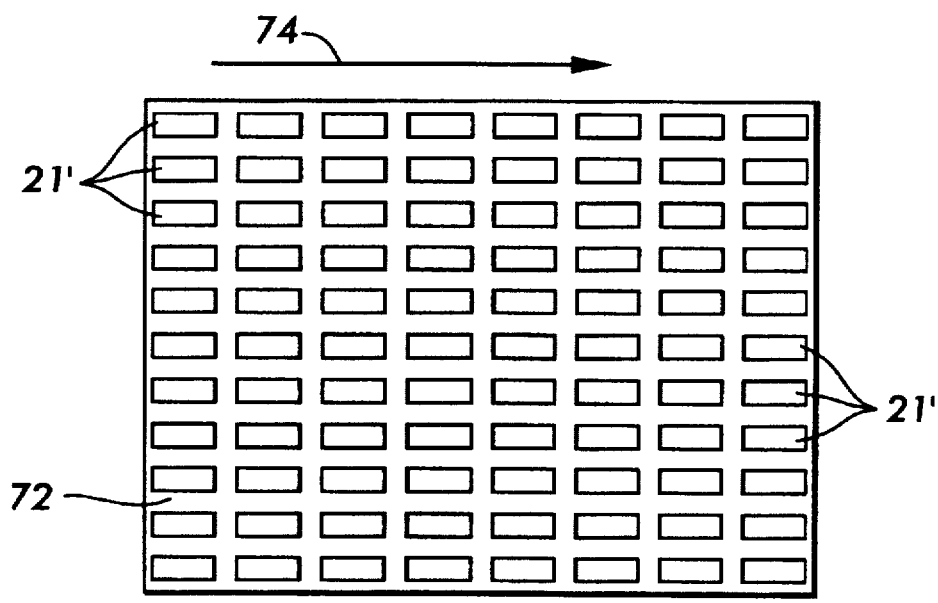
FIG. 20(a) shows a top view and FIG. 20(b) shows a side view.
Figure 20B:
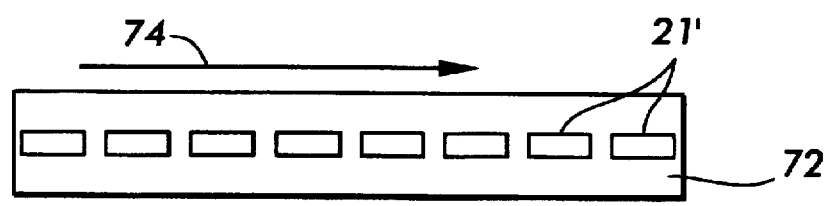

Manufacture of display elements 21' and display medium 2 would become correspondingly easier. The filaments 48 could be divided into display elements 21' in any convenient method and then stored in bulk until they are needed for manufacture of the display medium 2. To make the display medium 2, the display elements 21' would first be mixed with an uncured optically transparent material as shown in FIG. 19. FIG. 19(a) shows a top view of display elements 21' in the uncured optically transparent material and FIG. 19(b) depicts a side view of the display elements 21' suspended in an optically transparent material. The display elements 21' in the uncured optically transparent material would then be subjected to a magnetic field which causes the display elements 21' to align as shown in FIG. 20. FIG. 20(a) shows a top view of the display elements 21' aligned in a magnetic field 74 and FIG. 20(b) shows a side view of the display elements 21' aligned in a magnetic field 74. Once the display elements 21' have been aligned with the magnetic field 74, the optically transparent material can be cured, locking into place the alignment of the display elements 21'. After curing, the remaining step of immersion in a plasticizer as shown in FIG. 15 is identical.

I claim:

1. A display element comprising:
   a) a substantially clear cylindrical shape having a circumference, a length and longitudinal axis,
   b) at least three display surfaces arranged in a circumferential direction around the longitudinal axis to form a substantially polyhedral column extending substantially parallel to the longitudinal axis wherein each display surface has an associated optical modulation characteristic, and the polyhedral column is substantially enclosed by the substantially clear cylindrical shape, and
   c) said display element having an anisotropy for providing an electrical dipole moment, the electrical dipole moment rendering the display element electrically responsive such that when the display element is rotatably disposed in a non-oscillating electric field while the electrical dipole moment of the display element is provided, the display element tends to rotate substantially around the longitudinal axis to an orientation in which the electrical dipole moment aligns with the field.

2. The display element of claim 1 further comprising a magnetic portion substantially parallel to the longitudinal axis.

3. The display element of claim 2 wherein the magnetic portion resides on a display surface.

4. The display element of claim 2 wherein the magnetic portion is substantially surrounded by the polyhedral column.

5. The display element of claim 4 wherein the magnetic portion is coincident with the longitudinal axis.

6. The display element of claim 2 wherein the magnetic portion has a length substantially equal to the length of the substantially clear cylindrical shape.

7. The display element of claim 1 wherein each of the at least three display surfaces are substantially planar.

8. The display element of claim 1 wherein each associated optical modulation characteristic has an associated observable aspect and an associated display element orientation, each aspect being observable by an observer situated favorably to observe the display element when the display element is oriented in the associated display element orientation.

9. The display element of claim 1 wherein the at least three display surfaces comprises three display surfaces and the polyhedral column comprises a triangular column.

10. The display element of claim 1 wherein the at least three display surfaces comprises four display surfaces and the polyhedral column comprises a square column.

11. A sheet-like display medium, comprising:
   a. a plurality of rotatably disposed display elements wherein each display element comprises:
      i. a substantially clear cylindrical shape having a circumference, a length and a longitudinal axis,
      ii. at least three display surfaces arranged in a circumferential direction around the longitudinal axis to form a substantially polyhedral column extending substantially parallel to the longitudinal axis wherein each display surface has an associated optical modulation characteristic, and the polyhedral column is substantially enclosed by the substantially clear cylindrical shape, and
      iii. said display element having an anisotropy for providing an electrical dipole moment, the electrical dipole moment rendering the display element electrically responsive such that when a substantially non-oscillating electric field is provided while the electrical dipole moment of the display element is provided, the display element tends to rotate substantially around the longitudinal axis to an orientation in which the electrical dipole moment aligns with the field, and
   b. a transparent sheet-like substrate wherein said plurality of display elements are two-dimensionally arranged, said transparent sheet like substrate having two surfaces, one of which is a substantially optically transmissive viewing surface in which an image display surface is formed.

12. The sheet-like display medium of claim 11 wherein the display element further comprises a magnetic portion substantially parallel to the longitudinal axis.

13. The sheet-like display medium of claim 12 wherein the display element further comprises the magnetic portion residing on a display surface.

14. The sheet-like display medium of claim 12 wherein the display element further comprises the magnetic portion being substantially surrounded by the polyhedral column.

15. The sheet-like display medium of claim 14 wherein the display element further comprises the magnetic portion being coincident with the longitudinal axis.

16. The sheet-like display medium of claim 12 wherein the display element further comprises the magnetic portion having a length substantially equal to the length of the substantially clear cylindrical shape.

17. The sheet-like display medium of claim 11 wherein the display element further comprises each of the at least three display surfaces being substantially planar.

18. The sheet-like display medium of claim 11 wherein the display element further comprises each associated optical modulation characteristic having an associated observable aspect and an associated display element orientation, each aspect being observable by an observer situated favorably to observe the display element when the display element is oriented in the associated display element orientation.

19. The sheet-like display medium of claim 11 wherein the at least three display surfaces comprises three display surfaces and the polyhedral column comprises a triangular column.

20. The sheet-like display medium of claim 11 wherein the at least three display surfaces comprises four display surfaces and the polyhedral column comprises a square column.

21. The sheet like display medium of claim 11 further comprising means for rotating at least one display element around its longitudinal axis.

22. The sheet like display medium of claim 21 further comprising means for providing a substantially non-oscillating electric field for the means for rotating at least one display element around its longitudinal axis.

23. The sheet like display medium of claim 22 wherein the means for providing a substantially non-oscillating electric field comprises a matrix of discrete electrode groups.

24. The sheet like display medium of claim 23 wherein at least one discrete electrode group comprises a plurality of discrete electrodes.

25. The sheet like display medium of claim 24 wherein the plurality of discrete electrodes comprises four electrodes wherein two electrodes are arranged to be adjacent to the substantially optically transmissive viewing surface and two electrodes are arranged to be adjacent to the other surface.

26. The sheet like display medium of claim 24 wherein the plurality of discrete electrodes comprises three electrodes wherein two electrodes are arranged to be adjacent to the one surface and one electrode is arranged to be adjacent to the other surface.

27. The sheet like display medium of claim 21 wherein the transparent sheet-like substrate is capable of being separated from the means for rotating at least one display element around its longitudinal axis.

* * * * *

UNITED STATES PATENT AND TRADEMARK OFFICE
CERTIFICATE OF CORRECTION

PATENT NO.    : 5,894,367
DATED         : April 13, 1999
INVENTOR(S)   : Sheridon It is certified that error appears in the above-identified patent and that said Letters Patent is hereby corrected as shown below:

Column 1, lines 9 and 10, "(Attny. Docket No. 92105q2) Ser. No. 08/BBB,BBB" should read -- 962,976--.

Column 1, lines 13 and 14, "Attny Docket No. 92105q3) Ser. No. 08/CCC.CCC." should read -- 960,707--.

Column 2, lines 55 and 56, "U.S. Patent Application Ser. No. 08/572,780" should read --U.S. Pat. No. 5,767,826--.

Column 5, line 13, "C-C" should read --5B-5B--.

Column 9, line 67, "C-C" should read --5B-5B--.

Column 12, line 18, "31b is set to be greater" should read --31b is set to be less--.

Column 12, line 21, "31b is set to be less" should read --31b is set to be greater--.

Column 12, line 23, "21b is set to be higher" should read --21b is set to be less--.

Column 13, line 30, "Ser. No. 08/XXX,XXX" should read --Ser. No. 08/960,865--.

Signed and Sealed this

Twentieth Day of June, 2000

Attest:

Q. TODD DICKINSON

*Attesting Officer*                *Director of Patents and Trademarks*